US012707276B2

(12) United States Patent
Noh et al.

(10) Patent No.: US 12,707,276 B2
(45) Date of Patent: Aug. 11, 2026

(54) COMBINED COORDINATED SPATIAL REUSE, BEAMFORMING, AND NULLING TO INCREASE SPECTRAL EFFICIENCY IN HIGH-DENSITY WIRELESS NETWORKS

(71) Applicant: NEWRACOM, Inc., Irvine, CA (US)

(72) Inventors: Si-Chan Noh, Seoul (KR); Joonsoo Lee, Seoul (KR)

(73) Assignee: NEWRACOM, Inc., Irvine, CA (US)

( * ) Notice: Subject to any disclaimer, the term of this patent is extended or adjusted under 35 U.S.C. 154(b) by 285 days.

(21) Appl. No.: 18/654,299

(22) Filed: May 3, 2024

(65) Prior Publication Data

US 2024/0381110 A1 Nov. 14, 2024

Related U.S. Application Data

(60) Provisional application No. 63/501,340, filed on May 10, 2023.

(51) Int. Cl.
*H04W 16/14* (2009.01)
*H04B 7/06* (2006.01)
(Continued)

(52) U.S. Cl.
CPC .......... *H04W 16/14* (2013.01); *H04B 7/0626* (2013.01); *H04B 17/328* (2023.05); *H04W 16/28* (2013.01)

(58) Field of Classification Search
CPC ..... H04W 16/14; H04W 16/28; H04W 16/02; H04W 52/243; H04W 52/245;
(Continued)

(56) References Cited

U.S. PATENT DOCUMENTS 11,411,635 B2 * 8/2022 Wang .................... H04L 5/0035
11,678,326 B2 * 6/2023 Wang .................. H04W 52/146 370/329
(Continued)

FOREIGN PATENT DOCUMENTS

EP 3809735 A1 4/2021
EP 3849099 A1 * 7/2021 ........... H04B 7/0626
(Continued)

OTHER PUBLICATIONS

Office Action, KR App. No. 10-2024-0060967, May 18, 2025, 16 pages (09 pages of English Translation and 07 pages of Original Document).
(Continued)

*Primary Examiner* — Faruk Hamza
(74) *Attorney, Agent, or Firm* — Nicholson, De Vos, Webster & Elliott, LLP

(57) ABSTRACT

Spectral efficiency in dense multi-access point wireless networks is improved by combining coordinated spatial reuse and coordinated beamforming/nulling schemes. Access points are classified as sharing or shared based on medium access control, and stations are categorized into largest and smallest coordination gain areas. Coordinated spatial reuse is applied to non-overlapping stations in a small coordination gain area, while coordinated beamforming/nulling is used for overlapping stations in a largest coordination gain area. The shared access point adjusts its transmit power to minimize interference. Channel state information feedback overhead is reduced by considering only links related to the largest coordination gain area. The proposed method increases spectral efficiency, reduces overhead, and enhances coverage compared to using coordinated spatial reuse or coordinated beamforming/nulling alone.

20 Claims, 15 Drawing Sheets

(51) Int. Cl.
*H04B 17/318* (2015.01)
*H04W 16/28* (2009.01)

(58) Field of Classification Search
CPC ......................... H04W 74/0816; H04W 84/12; H04B 7/0626; H04B 17/328; H04B 7/024; H04B 7/0617; H04B 7/0658; H04B 17/318
See application file for complete search history.

(56) References Cited

U.S. PATENT DOCUMENTS 12,382,296 B2 * 8/2025 Cherian ................ H04W 24/10
12,584,404 B2 * 3/2026 Chau ....................... E21B 47/13
12,587,327 B2 * 3/2026 Li ......................... H04L 5/0035
12,588,089 B2 * 3/2026 Wang .................... H04W 76/15
2018/0206274 A1 7/2018 Cherian et al.
2019/0208423 A1 7/2019 Cherian et al.
2021/0297865 A1 * 9/2021 Cherian ................ H04W 24/10
2022/0116918 A1 * 4/2022 Park ...................... H04W 72/04
2022/0150819 A1 * 5/2022 Park ...................... H04W 72/12
2022/0248423 A1 8/2022 Monajemi et al.
2023/0269592 A1 * 8/2023 Wang .................... H04W 16/02 370/252
2024/0365374 A1 * 10/2024 Patil ...................... H04W 74/04
2025/0089093 A1 * 3/2025 Noh .................. H04W 74/0816
2025/0089103 A1 * 3/2025 Lee ..................... H04W 28/065
2025/0126641 A1 * 4/2025 Yu ..................... H04W 74/0808
2025/0158700 A1 * 5/2025 Lee .................... H04B 7/15528
2025/0212240 A1 * 6/2025 Lim .................. H04W 72/0446
2025/0212241 A1 * 6/2025 Smith .................. H04B 17/336
2025/0233638 A1 * 7/2025 Chou .................. H04B 7/0617
2025/0234372 A1 * 7/2025 Puducheri Sundaravaradhan ....... H04W 24/02
2025/0331021 A1 * 10/2025 Kalamkar ......... H04W 74/0866
2026/0032452 A1 * 1/2026 Kalamkar ............. H04W 16/10
2026/0067932 A1 * 3/2026 Helwa ............... H04W 74/0816
2026/0075520 A1 * 3/2026 Shah ................. H04W 52/0216

FOREIGN PATENT DOCUMENTS

WO WO-2015039116 A2 * 3/2015 .......... H04W 72/541
WO WO-2020097487 A1 * 5/2020 ............. H04B 7/024
WO 2022226298 A1 10/2022
WO WO-2024044120 A1 * 2/2024 .......... H04W 52/367
WO WO-2025137600 A1 * 6/2025 ........... H04W 84/12

OTHER PUBLICATIONS

IEEE P802.11ax/D8.0, "Draft Standard for Information Technology—Telecommunications and Information Exchange between Systems Local and Metropolitan Area Networks—Specific Requirements—Part 11: Wireless LAN Medium Access Control (MAC) and Physical Layer (PHY) Specifications—Amendment 1: Enhancements for High Efficiency WLAN", IEEE, Oct. 2020, 820 pages.

IEEE P802.11bd/D8.0, "Draft Standard for Information Technology—Telecommunications and Information Exchange between Systems Local and Metropolitan Area Networks—Specific Requirements—Part 11: Wireless LAN Medium Access Control (MAC) and Physical Layer (PHY) Specifications—Amendment 5: Enhancements for Next Generation V2X", IEEE, Oct. 2022, 148 pages.

IEEE P802.11be/D1.0, "Draft Standard for Information Technology—Telecommunications and Information Exchange between Systems Local and Metropolitan Area Networks—Specific Requirements—Part 11: Wireless LAN Medium Access Control (MAC) and Physical Layer (PHY) Specifications—Amendment 8: Enhancements for Extremely High Throughput (EHT)", IEEE, May 2021, 635 pages.

IEEE P802.11be/D5.1, "Draft Standard for Information Technology—Telecommunications and Information Exchange between Systems Local and Metropolitan Area Networks—Specific Requirements—Part 11: Wireless LAN Medium Access Control (MAC) and Physical Layer (PHY) Specifications—Amendment 2: Enhancements for Extremely High Throughput (EHT)", IEEE, Mar. 2024, 1051 pages.

IEEE Std 802.11-2016, "IEEE Standard for Information Technology—Telecommunications and Information Exchange between Systems Local and Metropolitan Area Networks—Specific Requirements—Part 11: Wireless LAN Medium Access Control (MAC) and Physical Layer (PHY) Specifications", IEEE, Dec. 7, 2016, 3534 pages.

IEEE Std 802.11a-1999 (R2003), "Supplemental to IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications—High-speed Physical Layer in the 5 GHz Band", IEEE, 1999 (Reaffirmed Jun. 12, 2003), 91 pages.

IEEE Std 802.11ac-2013, "IEEE Standard for Information Technology—Telecommunications and Information Exchange between Systems Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", IEEE, Dec. 18, 2013, 425 pages.

IEEE Std 802.11b-1999 (R2003), "Supplemental to IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications: Higher-Speed Physical Layer Extension in the 2.4 GHz Band", IEEE, Sep. 16, 1999 (Reaffirmed Jun. 12, 2003), 96 pages.

IEEE Std 802.11g-2003, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications—Amendment 4: Further Higher Data Rate Extension in the 2.4 GHz Band", IEEE, Jun. 27, 2003, 78 pages.

IEEE Std 802.11n-2009, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications—Amendment 5: Enhancements for Higher Throughput", IEEE, Oct. 29, 2009, 536 pages.

IEEE Std 802.11p-2010, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications—Amendment 6: Wireless Access in Vehicular Environments", IEEE, Jul. 15, 2010, 51 pages.

Notice of Allowance, KR App. No. 10-2024-0060967, Feb. 26, 2026, 10 pages (03 pages of English Translation and 07 pages of Original Document).

* cited by examiner

DATA
ENCODER
INTER-LEAVER
MAPPER
IFT
GI INSERTER
RF XMTR
TX SIGNAL PROCESSING UNIT
324
300
302
304
306
308
342
352

RF RCVR
GI REMOVER
FT
DE-MAPPER
DEINTER-LEAVER
DECODER
DATA
RX SIGNAL PROCESSING UNIT
354
344
326
318
316
314
312
310

| IEEE Standard | Max PHY rate | PHY rate enhancement | Bandwidth/number of spatial streams (SS) | Operating bands |
|---|---|---|---|---|
| 802.11b | 11 Mbps | | 22 MHz, 1 SS | 2.4 GHz |
| 802.11a/g | 54 Mbps | 5 X | 20 MHz, 1 SS | 5 GHz (.a)/2.4 GHz(.g) |
| 802.11n | 600 Mbps | 11 X | 40 MHz, 4 SS | 2.4/5 GHz |
| 802.11ac | 6.9 Gbps | 11 X | 160 MHz, 8 SS | 5 GHz |
| 802.11ax | 9.6 Gbps | 1.4 X | 160 MHz, 8 SS | 2.4/5 GHz |
| 802. 11be - Next Generation of 802.11 (EHT) | A Gbps | B X | 320 MHz, 16 SS | 2.4/5/6 GHz |

FIG. 6

| Element | Definition | Duration | DFT period | GI | Subcarrier spacing |
|---|---|---|---|---|---|
| Legacy(L)-STF | Non-high throughput(HT) Short Training field | 8 μs | - | - | equivalent to 1,250 kHz |
| L-LTF | Non-HT Long Training field | 8 μs | 3.2 μs | 1.6 μs | 312.5 kHz |
| L-SIG | Non-HT SIGNAL field | 4 μs | 3.2 μs | 0.8 μs | 312.5 kHz |
| RL-SIG | Repeated Non-HT SIGNAL field | 4 μs | 3.2 μs | 0.8 μs | 312.5 kHz |
| U-SIG | Universal SIGNAL field | NUSIG *4 μs | 3.2 μs | 0.8 μs | 312.5 kHz |
| EHT-SIG | EHT SIGNAL field | NEHESIG * 4 μs | 3.2 μs | 0.8 μs | 312.5 kHz |
| EHT-HARQ | EHT HARQ field | TBD | TBD | TBD | TBD |
| EHT-STF | EHT Short Training field | TBD | TBD | TBD | TBD |
| EHT-LTF | EHT Long Training field | NEHTLTF * (DTF period + GI) μs | • 2xLTF: 6.4 μs<br>• 4xLTF: 12.8 μs | supports 0.8, 1.6, 3.2 μs | • 2xLTF: (equivalent to) 156.25 kHz;<br>• 4xLTF: 78.125 kHz |
| EHT-DATA | EHT DATA field | NDATA * (DTF period + GI) μs | 12.8 μs | supports 0.8, 1.6, 3.2 μs | 78.125 kHz |
| EHG-MA | EHT Midamble field | TBD | TBD | TBD | TBD |

FIG. 7

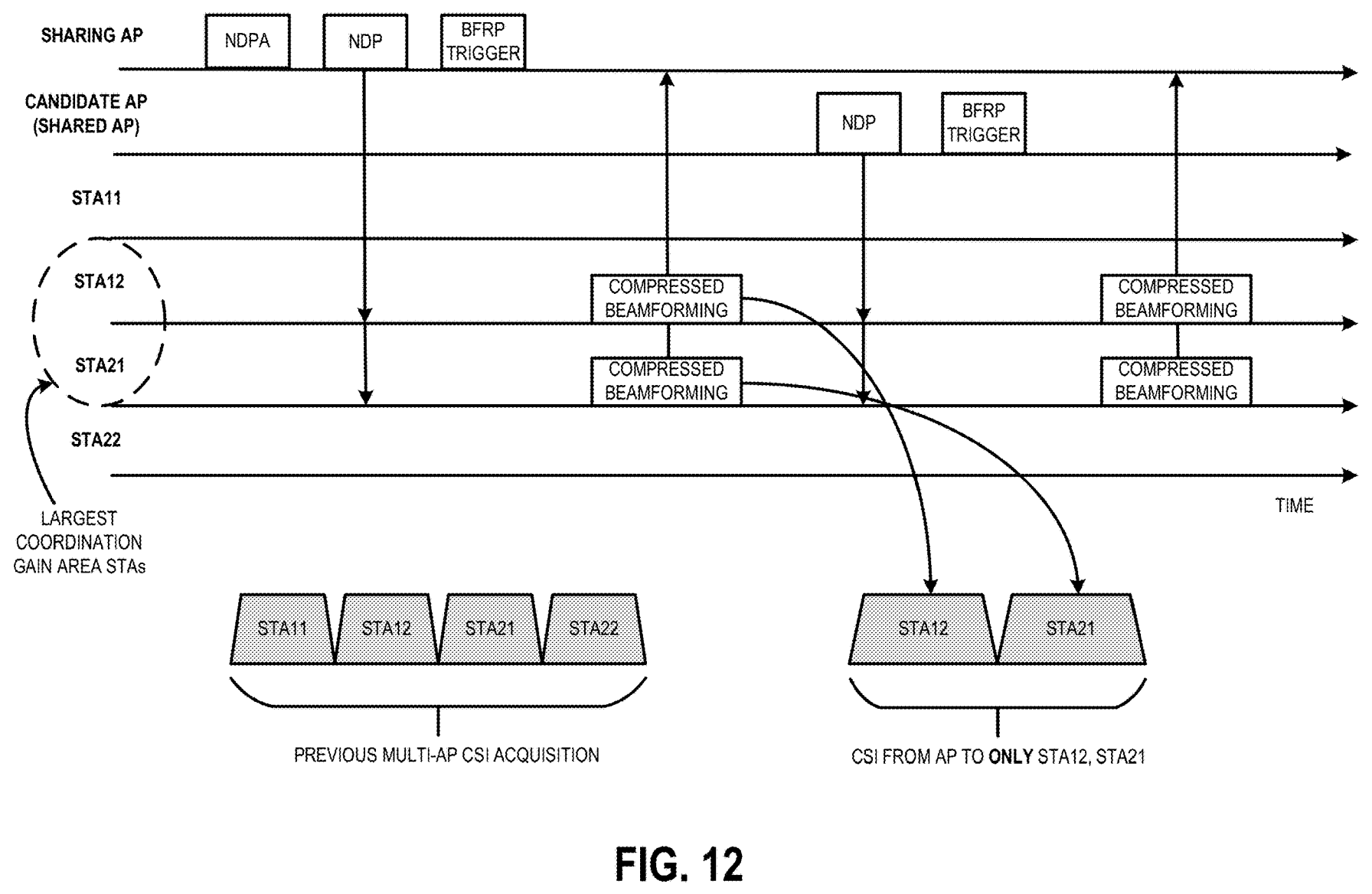

SHARING AP
NDPA
NDP
BFRP TRIGGER
CANDIDATE AP (SHARED AP)
NDP
BFRP TRIGGER
STA11
STA12
COMPRESSED BEAMFORMING
COMPRESSED BEAMFORMING
STA21
COMPRESSED BEAMFORMING
COMPRESSED BEAMFORMING
STA22
TIME
LARGEST COORDINATION GAIN AREA STAs
STA11
STA12
STA21
STA22
PREVIOUS MULTI-AP CSI ACQUISITION
STA12
STA21
CSI FROM AP TO ONLY STA12, STA21

FIG. 12

COMBINED COORDINATED SPATIAL REUSE, BEAMFORMING, AND NULLING TO INCREASE SPECTRAL EFFICIENCY IN HIGH-DENSITY WIRELESS NETWORKS

CROSS-REFERENCE TO RELATED APPLICATION

This application claims the benefit of U.S. Provisional Application No. 63/501,340 filed May 10, 2023, which is hereby incorporated by reference.

TECHNICAL FIELD

The present disclosure generally relates to wireless communications, and more specifically, relates to combined coordinated spatial reuse, beamforming, and nulling to increase spectral efficiency in high-density wireless networks.

BACKGROUND

Institute of Electrical and Electronics Engineers (IEEE) 802.11 is a set of standards for implementing wireless local area network communication in various frequencies, including but not limited to the 2.4 gigahertz (GHz), 5 GHZ, 6 GHZ, and 60 GHz bands. These standards define the protocols that enable Wi-Fi devices to communicate with each other. The 802.11 family of standards has evolved over time to accommodate higher data rates, improved security, and better performance in different environments. Some of the most widely used standards include 802.11a, 802.11b, 802.11g, 802.11n, 802.11ac, and the latest 802.11ax (also known as “Wi-Fi 6”). These standards specify the modulation techniques, channel bandwidths, and other technical aspects that ensure interoperability between devices from various manufacturers. IEEE 802.11 has played an important role in the widespread adoption of wireless networking in homes, offices, and public spaces, enabling users to connect their devices to the internet and each other without the need for wired connections.

IEEE 802.11be, also known as “Wi-Fi 7”, is the next generation of the IEEE 802.11 family of standards for wireless local area networks. Currently under development, 802.11be aims to significantly improve upon the capabilities of its predecessor, 802.11ax/Wi-Fi 6, by offering even higher data rates, lower latency, and increased reliability. The standard is expected to leverage advanced technologies such as multi-link operation (MLO), which allows devices to simultaneously use multiple frequency bands and channels for enhanced performance and reliability. Additionally, 802.11be will introduce 4096-QAM (Quadrature Amplitude Modulation), enabling higher data rates by encoding more bits per symbol. The standard will also feature improved medium access control (MAC) efficiency, enhanced power saving capabilities, and better support for high-density environments. With these advancements, 802.11be is expected to deliver theoretical maximum data rates of up to 46 gigabits per second (Gbps), making it suitable for bandwidth-intensive applications such as virtual and augmented reality, 8K video streaming, and high-performance gaming. The IEEE 802.11be standard is projected to be finalized by the end of 2024, paving the way for the next generation of Wi-Fi devices and networks.

In high-density wireless networks, the IEEE 802.11be standard aims to increase spectral efficiency by incorporating various Multi-Access Point (Multi-AP) schemes, such as Coordinated-TDMA (C-TDMA), Coordinated-OFDMA, Coordinated-beamforming (Co-BF), Coordinated-Nulling, Coordinated spatial reuse (Co-SR), and joint transmission (JTX). The current IEEE 802.11 standard for Co-SR requires each Access Point (AP) to cover all stations (STAs) associated with its own AP. However, when adjusting an AP’s power according to power constraints to clearly cover the STAs from other APs, the coverage of the AP may be reduced. As a result, the AP cannot cover all its associated STAs, leading to lower overall system throughput. This issue poses a significant challenge in achieving the desired spectral efficiency improvements in high-density wireless networks.

BRIEF DESCRIPTION OF THE DRAWINGS

The disclosure will be more fully understood from the detailed description provided below and the accompanying drawings that depict various embodiments of the disclosure. However, these drawings should not be interpreted as limiting the disclosure to the specific embodiments shown; they are provided for explanation and understanding only.

FIG. 6 is a table of various characteristics of several wireless networking standards, in accordance with some embodiments of the present disclosure.

FIG. 7 is a table of various fields of an extremely high throughput physical protocol data unit frame, in accordance with some embodiments of the present disclosure.

FIG. 12 illustrates an example of a reduced channel state information feedback procedure, in accordance with some embodiments of the present disclosure.

DETAILED DESCRIPTION

Figure 1:
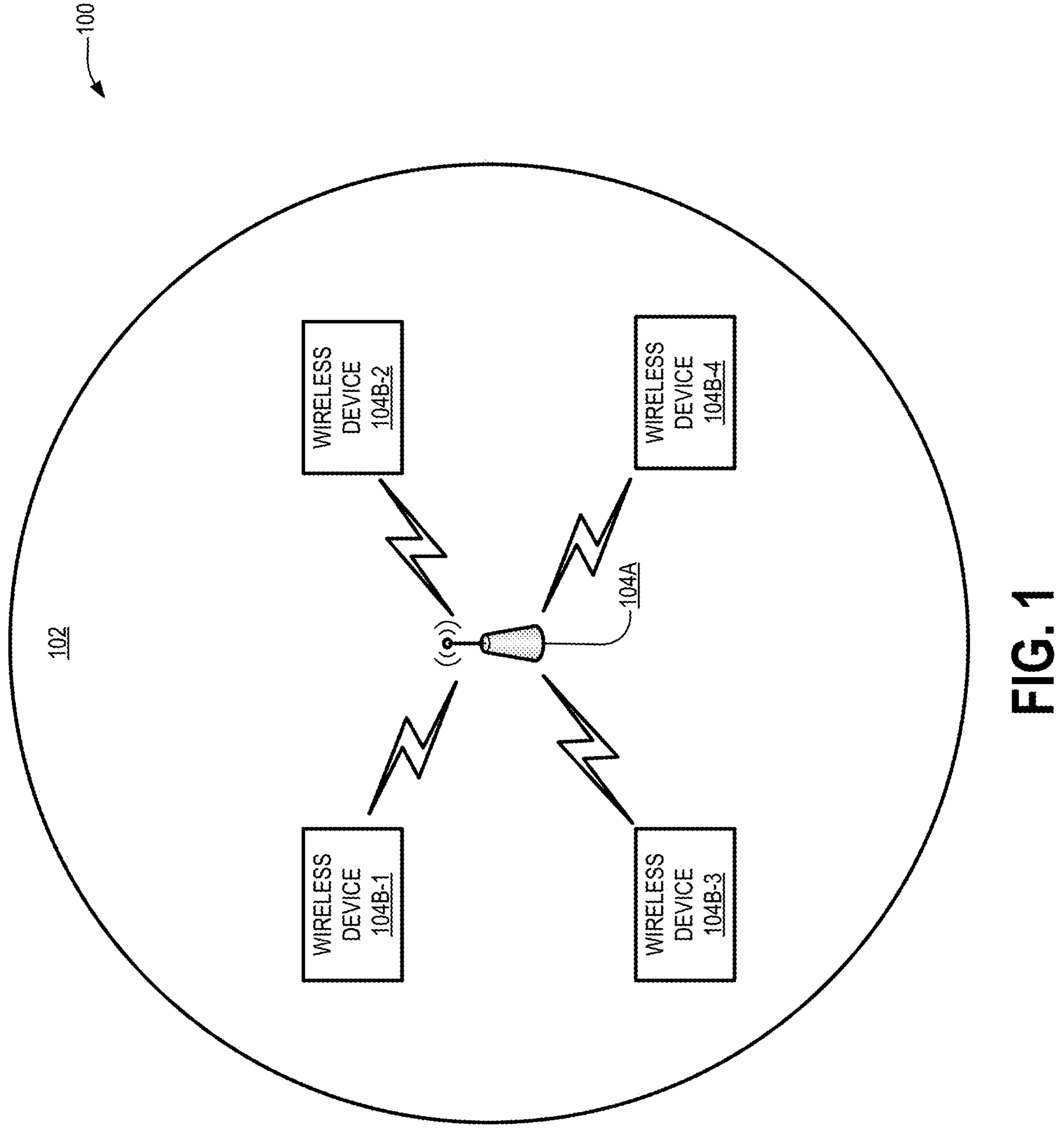
FIG. 1 illustrates an example of a wireless local area network with a basic service set that includes multiple wireless devices, in accordance with some embodiments of the present disclosure.

The present disclosure generally relates to wireless communications, and more specifically, relates to combined coordinated spatial reuse, beamforming, and nulling to increase spectral efficiency in high-density wireless networks.

To address the problem of reduced coverage and lower overall system throughput in high-density wireless networks, multi-Access Point (AP) transmission techniques are disclosed herein. The techniques combine Coordinated spatial reuse (Co-SR) with Coordinated-beamforming (Co-BF) and Coordinated-Nulling. By integrating these, the techniques aim to ensure that each AP can cover all its associated STAs, even when adjusting power levels to accommodate STAs from other APs. The techniques effectively increase the coverage area compared to previous multi-AP schemes, thereby improving the overall system throughput.

Furthermore, the techniques reduce the amount of Channel State Information (CSI) feedback required by considering overlapping STAs located in the largest coordination gain area. By focusing on these high-impact STAs, the techniques optimize the use of available resources and enhance the spectral efficiency in high-density wireless networks.

In one embodiment of the techniques, a method, performed by a wireless device functioning as a sharing access point in a wireless network, involves wirelessly sending a beacon or management frame to find a shared access point capable of coordinated spatial reuse operation. The method applies a coordinated spatial reuse scheme to non-overlapping stations within the smallest coordination gain area of the network and applies a coordinated beamforming scheme, a coordinated nulling scheme, or a combination of both to overlapping stations within the largest coordination gain area. The sharing access point wirelessly transmits data to an associated station within the smallest coordination gain area according to the coordinated spatial reuse scheme and to an associated station within the largest coordination gain area according to the coordinated beamforming scheme, the coordinated nulling scheme, or a combination of both.

In another embodiment of the techniques, a method, executed by a wireless device acting as a shared access point in a wireless network, involves wirelessly transmitting an indication of its capability for coordinated spatial reuse operation. The shared access point updates its transmit power using received signal strength indicator (RSSI) and tolerable receiver interference level (TRIL) information in accordance with a coordinated spatial reuse scheme. The method applies the coordinated spatial reuse scheme to non-overlapping stations within the smallest coordination gain area of the network and applies a coordinated beamforming scheme, a coordinated nulling scheme, or a combination of both to overlapping stations within the largest coordination gain area. The shared access point wirelessly transmits data to an associated station within the smallest coordination gain area using the coordinated spatial reuse scheme and to an associated station within the largest coordination gain area using the coordinated beamforming scheme, the coordinated nulling scheme, or a combination of both.

The methods improve the spectral efficiency and coverage in dense multi-access point wireless networks, particularly in IEEE 802.11 wireless LANs. By combining coordinated spatial reuse (Co-SR) and coordinated beamforming/nulling (Co-BF/Nulling) schemes, the methods optimize the transmission strategies for both overlapping and non-overlapping stations within the network. The sharing access point and shared access point work together to minimize interference and enhance system performance by applying Co-SR to non-overlapping stations in the smallest coordination gain area and Co-BF/Nulling to overlapping stations in the largest coordination gain area. The shared access point further optimizes its transmit power using RSSI and TRIL information. These techniques lead to increased spectral efficiency, reduced overhead, and improved coverage compared to using Co-SR or Co-BF/Nulling alone, ultimately benefiting the overall performance of the wireless network.

For sake of illustration, various embodiments are primarily described herein in the context of wireless networks based on Institute of Electrical and Electronics Engineers (IEEE) 802.11 standards using terminology thereof. However, embodiments are not limited thereto. Those skilled in the relevant art will appreciate that the techniques disclosed herein can be used in other types of wireless networks.

In the following detailed description, only certain embodiments of the present invention have been shown and described, simply by way of illustration. As those skilled in the art would realize, the described embodiments may be modified in different ways, all without departing from the spirit or scope of the present invention. Accordingly, the drawings and description are to be regarded as illustrative in nature and not restrictive. Like reference numerals designate like elements throughout the specification.

FIG. 1 depicts a wireless local area network 100 (WLAN 100) with a basic service set (BSS) 102. The BSS 102 comprises multiple wireless devices 104 (also known as WLAN devices 104). Each wireless device 104 is equipped with a medium access control (MAC) layer and a physical (PHY) layer, conforming to the IEEE 802.11 standard, which may include any of its amendments (e.g., 802.11a/b/g/n/p/ac/ax/bd/be and beyond).

In one embodiment, the medium access control (MAC) layer of a wireless device 104 can initiate the transmission of a frame to another wireless device 104 by passing a PHY-TXSTART.request (TXVECTOR) to the physical (PHY) layer. The TXVECTOR specifies parameters for generating and/or transmitting the corresponding frame. Likewise, the PHY layer of a receiving wireless device can generate an RXVECTOR, which includes parameters of the received frame, and pass it to the MAC layer for processing.

The group of wireless devices 104 may include a wireless device 104A that serves as an access point, sometimes referred to as an "access point station" or "AP STA," and other wireless devices 104B1-104B4 that function as non-access point stations, often called "non-AP STAs."

Alternatively, in an ad-hoc networking environment, all devices in the group, 104, might be non-access point stations. Typically, both the access point station (e.g., wireless device 104A) and the non-access point stations (e.g., wireless devices 104B1-104B4) are collectively considered stations. However, for simplicity in this description, the term "station" may sometimes only refer to non-access point stations. While this example shows four non-access point stations (wireless devices 104B-1 through 104B-4), the wireless local area network (WLAN) 100 can accommodate any number of non-access point stations (e.g., one or more wireless devices 104B).

Figure 2:
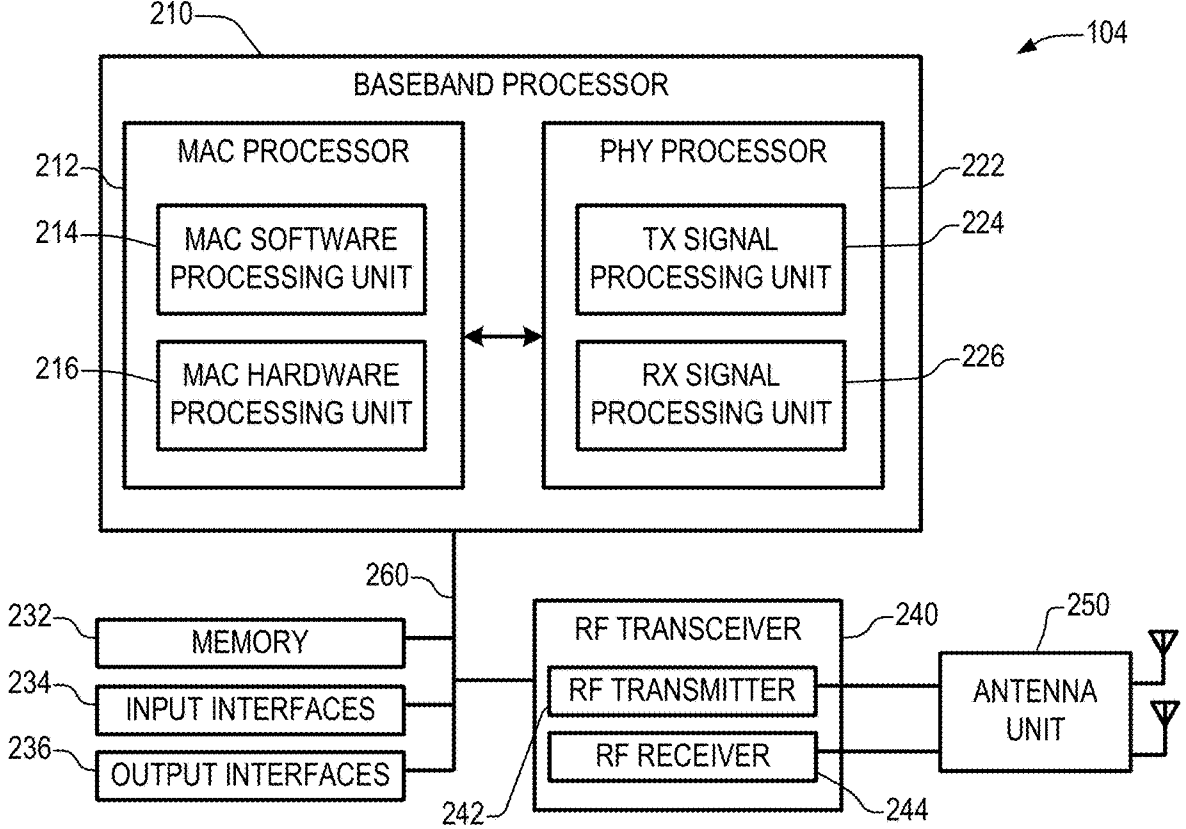
FIG. 2 is a schematic diagram of a wireless device, in accordance with some embodiments of the present disclosure.

FIG. 2 presents a schematic block diagram of a wireless device 104, according to an embodiment. This wireless device 104 could be either the wireless device 104A (e.g., the access point of wireless local area network (WLAN) 100) or any of the wireless devices 104B-1 through 104B-4 depicted in FIG. 1. The wireless device 104 comprises a baseband processor 210, a radio frequency (RF) transceiver 240 (RF transceiver 240), an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 are interconnected via a bus 260.

The baseband processor 210 is responsible for baseband signal processing and encompasses a medium access control (MAC) processor 212 (MAC processor 212) and a physical (PHY) processor 222 (PHY processor 222). It may access memory 232, which can be a non-transitory computer-readable medium containing software (e.g., programmable instructions) and data.

In an embodiment, the MAC processor 212 comprises a MAC software processing unit 214 and a MAC hardware processing unit 216. The MAC software processing unit 214 executes MAC software to perform a first set of functions of the MAC layer, which can be part of the software stored in storage device 232. Conversely, the MAC hardware processing unit 216 realizes a second set of MAC layer functions through specialized hardware. However, the configuration of the MAC processor 212 is not limited to these arrangements. For instance, it may be designed to execute both sets of functions entirely in software or entirely in hardware, depending on the specific implementation.

The PHY processor 222 comprises a transmitting (TX) signal processing unit (SPU) 224 (TxSPU 224) and a receiving (RX) SPU 226 (RxSPU 226). It executes a variety of functions associated with the physical (PHY) layer, which can be carried out in software, hardware, or a mix of both, depending on the implementation.

Functions performed by the TxSPU 224 may include, but are not limited to, forward error correction (FEC) encoding, parsing streams into one or more spatial streams, diversity encoding of these spatial streams into a multitude of space-time streams, spatial mapping of space-time streams to transmit chains, inverse Fourier transform computation, and cyclic prefix insertion to establish a guard interval. Conversely, the RxSPU 226 may handle functions that are essentially the inverses of those performed by the TxSPU 224, such as guard interval removal, Fourier transform computation, among others.

The RF transceiver 240 comprises an RF transmitter 242 and an RF receiver 244. It is designed to transmit information (referred to as first information) received from the baseband processor 210 to the wireless local area network (WLAN) 100 (for example, to another wireless device 104 within the WLAN 100) and to relay information (referred to as second information) received from the WLAN 100 (for example, from another wireless device 104 of the WLAN 100) back to the baseband processor 210.

The antenna unit 250 comprises one or more antennas. For applications utilizing multiple-input, multiple-output (MIMO) or multi-user multiple-input, multiple-output (MU-MIMO), the antenna unit 250 may feature a plurality of antennas. In certain embodiments, these antennas can function as part of a beamforming array. Additionally, the antennas within the antenna unit 250 can be either directional, with options for fixed or steerable orientations.

Input interfaces 234 receive information from a user, while the output interfaces 236 convey information to the user. The input interfaces 234 may consist of one or more of the following: a keyboard, keypad, mouse, touchscreen, microphone, among others. Similarly, the output interfaces 236 may include one or more of the following: a display device, touchscreen, speaker, among others.

As outlined in this document, numerous functions of the wireless local area network (WLAN) device 104 can be realized through either hardware or software. The decision to implement certain functions in software and others in hardware is influenced by various design constraints. These constraints may encompass aspects such as design and manufacturing costs, time-to-market objectives, power consumption considerations, and the availability of semiconductor technology, among others.

As described herein, a wide variety of electronic devices, circuits, firmware, software, and combinations thereof may be used to implement the functions of the components of the wireless local area network (WLAN) device 104. Furthermore, the WLAN device 104 may include other components, such as application processors, storage interfaces, clock generator circuits, power supply circuits, and the like, which have been omitted in the interest of brevity.

Figures 3A, 3B:
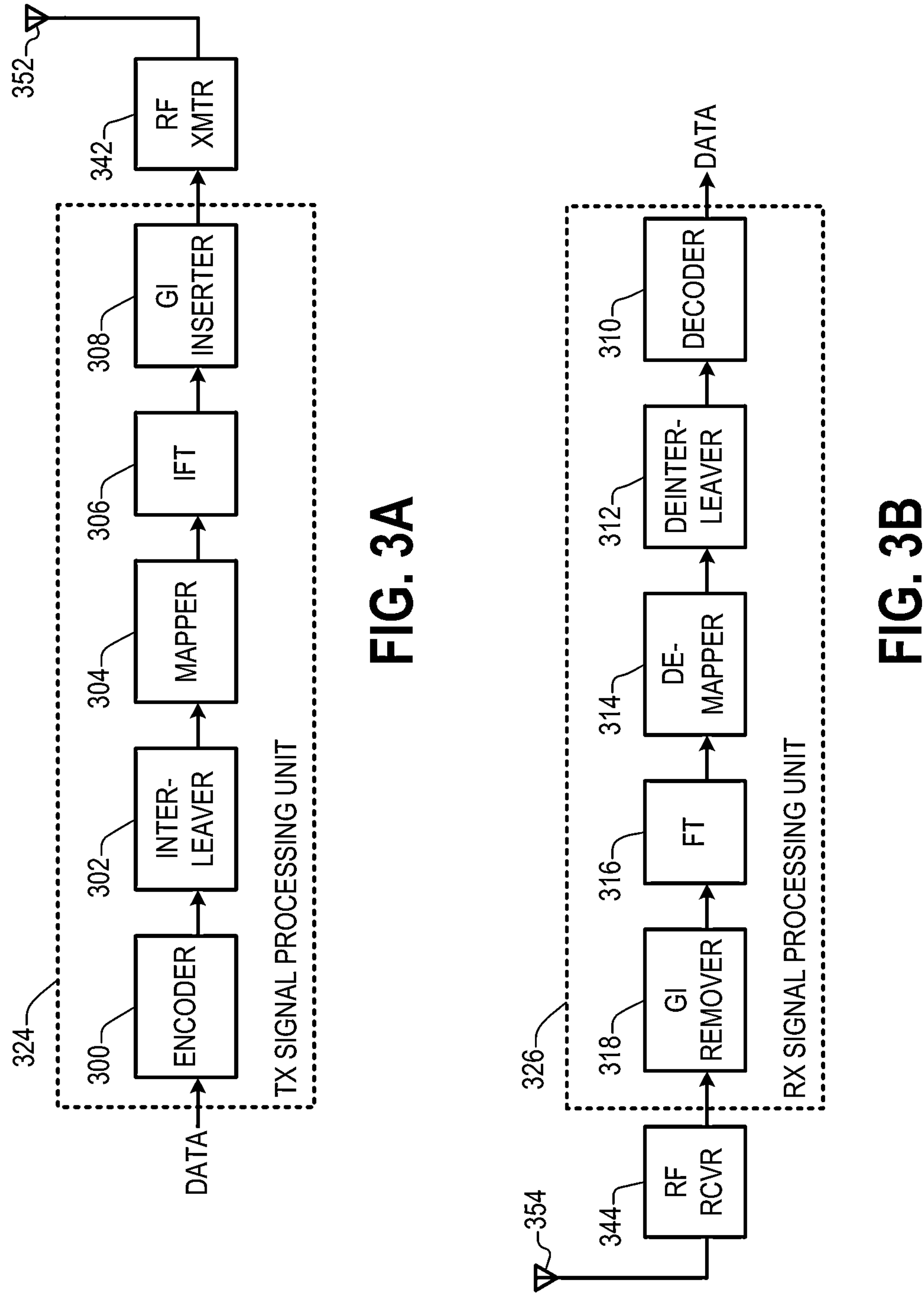
FIG. 3A illustrates components of a wireless device configured to transmit data, in accordance with some embodiments of the present disclosure.
FIG. 3B illustrates components of a wireless device configured to receive data, in accordance with some embodiments of the present disclosure.

FIG. 3A illustrates components of a wireless local area network (WLAN) device 104 configured to transmit data according to an embodiment, including a transmitting (TX) signal processing unit (SPU) 324 (TxSPU 324), a radio frequency (RF) transmitter 342 (RF transmitter 342), and an antenna 352. In an embodiment, the TxSPU 324, the RF transmitter 342, and the antenna 352 correspond to the TxSPU 224, the RF transmitter 242, and an antenna of the antenna unit 250 of FIG. 2, respectively.

The TxSPU 324 comprises an encoder 300, an interleaver 302, a mapper 304, an inverse Fourier transformer 306, and a guard interval inserter 308.

Encoder 300 receives input data and encodes it. In one embodiment, the encoder 300 features a forward error correction (FEC) encoder, which may consist of a binary convolutional code encoder followed by a puncturing device. Alternatively, the FEC encoder may utilize a low-density parity-check encoder.

The TxSP 324 may also incorporate a scrambler to scramble the input data before encoding by the encoder 300, aiming to minimize the likelihood of prolonged sequences of 0s or Is. When binary convolutional code encoding is executed by the encoder 300, the TxSP 324 might include an encoder parser to demultiplex the scrambled bits across multiple binary convolutional code encoders. However, if the encoder utilizes low-density parity-check encoding, the TxSP 324 may forego the use of the encoder parser.

The interleaver 302 interleaves the bits of each stream output from the encoder 300, altering their order. The interleaver 302 applies interleaving specifically when the encoder 300 performs binary convolutional code encoding. In cases where binary convolutional code encoding is not used, it may pass the stream output from the encoder 300 without modifying the bit order.

Mapper 304 converts the sequence of bits output from the interleaver 302 into constellation points. When the encoder 300 uses low-density parity-check encoding, the mapper 304 may additionally execute low-density parity-check tone mapping, alongside constellation mapping.

When the TxSP 324 is engaged in multiple-input, multiple-output (MIMO) or multi-user multiple-input, multiple-output (MU-MIMO) transmissions, it may incorporate multiple interleavers 302 and mappers 304, corresponding to the number of spatial streams involved in the transmission. Additionally, the TxSP 324 might feature a stream parser to segment the encoder 300's output into blocks, which are then distributed to different interleavers 302 or mappers 304. It may also include a space-time block code encoder to disperse the constellation points across the spatial streams into a set number of space-time streams, and a spatial mapper tasked with assigning these space-time streams to transmit chains. This spatial mapper could employ strategies such as direct mapping, spatial expansion, or beamforming for optimal transmission.

The inverse Fourier transform 306 transforms a block of constellation points, received from the mapper 304 or, in cases of multiple-input, multiple-output (MIMO) or multi-user multiple-input, multiple-output (MU-MIMO), the spatial mapper, into a time domain block (e.g., a symbol) through an inverse discrete Fourier transform or an inverse fast Fourier transform. When employing the space-time block code encoder and the spatial mapper, a dedicated inverse Fourier transform 306 may be provided for each transmit chain.

When conducting a multiple-input, multiple-output (MIMO) or multi-user multiple-input, multiple-output (MU-MIMO) transmission, the TxSP 324 may incorporate cyclic shift diversities to avert unintended beamforming. The cyclic shift diversities insertion can occur either before or after the inverse Fourier transform 306 process. It can be applied specifically for each transmit chain or for each space-time stream. Alternatively, cyclic shift diversities may be integrated as part of the spatial mapping process.

In multiple-input, multiple-output (MIMO) or multi-user multiple-input, multiple-output (MU-MIMO) transmissions conducted by the TxSP 324, specific blocks preceding the spatial mapper are allocated individually for each user.

The guard interval inserter 308 appends a guard interval to the beginning of each symbol output by the inverse Fourier transform 306. This guard interval typically comprises a cyclic prefix, which is a duplicate of the symbol's concluding segment, placed before the symbol to mitigate interference. Optionally, the TxSP 324 can apply windowing to each symbol post-guard interval insertion to smooth out the symbol edges.

The RF transmitter 342 converts the baseband symbols into a radio frequency (RF) signal and then transmits this RF signal through antenna 352. In cases where the TxSP 324 supports multiple-input, multiple-output (MIMO) or multi-user multiple-input, multiple-output (MU-MIMO) transmissions, both the guard interval inserter 308 and the RF transmitter 342 are configured for each individual transmit chain.

FIG. 3B illustrates components of a wireless local area network (WLAN) device 104 configured to receive data, including a receiver signal processing unit 326 (RxSPU 326), a radio frequency (RF) receiver 344 (RF receiver 344), and an antenna 354. In this embodiment, the RxSPU 326, RF receiver 344, and antenna 354 correspond to the receiving SPU 226, the RF receiver 244, and one of the antennas in the antenna unit 250 of FIG. 2, respectively.

The RxSPU 326 includes a guard interval remover 318, a Fourier transformer 316 (FT 316), a demapper 314, a deinterleaver 312, and a decoder 310.

The RF receiver 344 receives a radio frequency (RF) signal via the antenna 354 and converts the RF signal into symbols. The guard interval remover 318 then removes the guard interval from each symbol. When the received transmission employs multiple-input, multiple-output (MIMO) or multi-user multiple-input, multiple-output (MU-MIMO) technology, the RF receiver 344 and the guard interval remover 318 may be allocated for each receive chain.

The FT 316 converts each symbol (e.g., each time domain block) into a frequency domain block of constellation points using either a discrete Fourier transform (DFT) or a fast Fourier transform (FFT). FT 316 may be allocated for each receive chain.

When the received transmission is a multiple-input, multiple-output (MIMO) or multi-user multiple-input, multiple-output (MU-MIMO) transmission, the RxSP 326 may include a spatial demapper that converts the outputs of the FTs 316 from the receiver chains into constellation points of multiple space-time streams. Additionally, a space-time block code decoder may be employed for despreading the constellation points from the space-time streams into one or more spatial streams.

The demapper 314 demaps the constellation points output from the FT 316 or the space-time block code decoder to bit streams. If the received transmission was encoded using low-density parity-check encoding, demapper 314 may further perform low-density parity-check tone demapping before performing the constellation demapping.

The deinterleaver 312 deinterleaves the bits of each stream output from the demapper 314. It performs deinterleaving specifically when the received transmission was encoded with binary convolutional code encoding. Otherwise, it may pass the stream from demapper 314 without any deinterleaving.

When the received transmission employs multiple-input, multiple-output (MIMO) or multi-user multiple-input, multiple-output (MU-MIMO) technology, the RxSP 326 may incorporate multiple demappers 314 and deinterleavers 312, matching the number of spatial streams in the transmission. In such scenarios, the RxSP 326 may also include a stream deparser for aggregating the outputs from the deinterleavers 312.

The decoder 310 processes the streams emanating from either deinterleaver 312 or the stream deparser. In a specific embodiment, the decoder 310 is equipped with a forward error correction (FEC) decoder. This FEC decoder can be configured as either a binary convolutional code decoder or a low-density parity-check decoder.

The RxSP 326 might also incorporate a descrambler to revert the decoding process on the decoded data. If binary convolutional code decoding is executed by decoder 310, the RxSP 326 could additionally employ an encoder deparser for aggregating the data decoded by multiple binary convolutional code decoders. Conversely, if low-density parity-check decoding is carried out by decoder 310, the use of the encoder deparser may not be necessary.

Before initiating a transmission, wireless devices, including wireless device 104, assess the availability of the wireless medium through clear channel assessment (CCA). CCA determines the medium as busy if it is occupied, and idle if it is available.

The physical (PHY) entity of Institute of Electrical and Electronics Engineers (IEEE) 802.11 is based on Orthogonal Frequency Division Multiplexing (OFDM) or Orthogonal Frequency Division Multiple Access (OFDMA). In both OFDM and OFDMA Physical (PHY) layers, a station, such as wireless device 104, can transmit and receive PHY Protocol Data Units (PPDUs) in accordance with the mandatory PHY specifications. These specifications define a set of Modulation and Coding Schemes (MCS) and the maximum number of spatial streams. Certain PHY entities also specify downlink (DL) and uplink (UL) Multi-User (MU) transmissions, detailing a maximum number of space-time streams (STS) per user and a total number of STSs. PHY entities may support channel widths of 10 MHZ, 20 MHz, 40 MHz, 80 MHz, 160 MHz, 240 MHz, and 320 MHz for contiguous channels, as well as 80+80, 80+160 MHz, and 160+160 MHz for non-contiguous channels. Each channel comprises multiple subcarriers, also known as tones. PHY entities define signaling fields within a PPDU, such as Legacy Signal (L-SIG), Signal A (SIG-A), and Signal B (SIG-B), to communicate essential information about PHY Service Data Unit (PSDU) attributes. For clarity and conciseness, the descriptions that follow will focus on OFDM-based 802.11 technology, referring to a station as a non-access point station unless specified otherwise.

Figure 4:
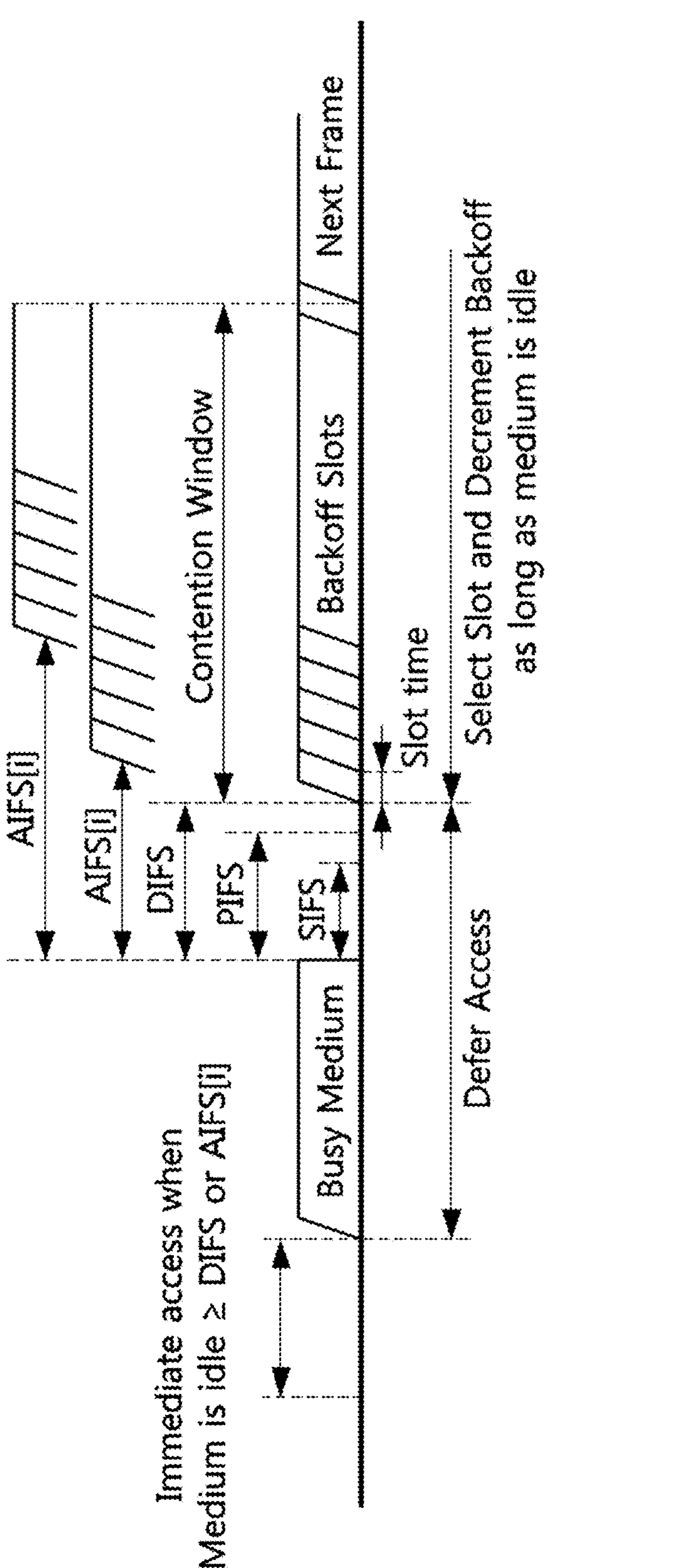
FIG. 4 illustrates inter-frame space relationships, in accordance with some embodiments of the present disclosure.

FIG. 4 illustrates the relationships among Inter-Frame Spaces (IFSs), showcasing a Short IFS (SIFS), a Point Coordination Function IFS (PIFS), a Distributed Coordination Function IFS (DIFS), and an Arbitration IFS (AIFS) for Access Category ‘i’ (AIFS[i]). Additionally, the figure depicts a slot time and the transmission of a data frame, which is forwarded to a higher layer for processing. As illustrated, a wireless local area network (WLAN) device 104 initiates the transmission of the data frame following a backoff period, provided that a DIFS duration has passed with the medium remaining idle.

Management frames are utilized to exchange management information, which is not forwarded to higher layers. The subtypes of management frames include beacon frames, association request/response frames, probe request/response frames, and authentication request/response frames.

Control frames are employed to manage access to the medium. The subtypes of control frames encompass Request to Send (RTS), Clear to Send (CTS), and Acknowledgement (ACK) frames.

When the control frame does not serve as a response to another frame, wireless local area network (WLAN) device 104 transmits the control frame after initiating a backoff procedure, provided a DIFS (Distributed Coordination Function Inter-Frame Space) period has passed with the medium being idle. Conversely, if the control frame is a response to another frame, WLAN device 104 transmits the control frame following a SIFS (Short Inter-Frame Space) period, without performing a backoff or assessing the medium’s idle status.

A wireless local area network (WLAN) device 104 equipped with quality of service (QoS) capabilities (sometimes referred to as a “QoS STA”) may initiate frame transmission after a backoff period, provided that the Arbitration Inter-Frame Space (AIFS) corresponding to the access category (AC) associated with the frame (i.e., AIFS [AC]) has elapsed. For transmissions by a QOS STA, data frames, management frames, and control frames (excluding response frames) can utilize the AIFS [AC] designated for the AC of the frame being transmitted.

A wireless local area network (WLAN) device 104 may initiate a backoff procedure upon finding the medium occupied when it is prepared to transmit a frame. This procedure entails calculating a random backoff duration consisting of N backoff slots, with each slot corresponding to a predefined slot time and N representing an integer greater than or equal to zero. The selection of the backoff period is influenced by the size of the Contention Window (CW). Furthermore, the backoff duration can be adjusted based on the Access Category (AC) of the frame in question. The commencement of all backoff slots follows either a Distributed Coordination Function Inter-Frame Space (DIFS) or an Extended Inter-Frame Space (EIFS), during which the medium must be observed as idle for the entirety of the interval.

When the wireless local area network (WLAN) device 104 observes no activity on the medium for the length of a designated backoff slot, the backoff procedure mandates reducing the backoff time by one slot time. Should the WLAN device 104 find the medium occupied during a backoff slot, the backoff process is paused and resumes only after the medium is perceived as idle for a complete Distributed Coordination Function Inter-Frame Space (DIFS) or Extended Inter-Frame Space (EIFS) interval. The device is then authorized to initiate the transmission or retransmission of the frame once the backoff timer counts down to zero.

The backoff procedure functions such that when multiple wireless local area network (WLAN) devices 104 defer and initiate the backoff process, each device selects a backoff time through a random function. The device with the shortest backoff time gains priority in the contention, thereby minimizing the likelihood of a collision.

Figure 5:
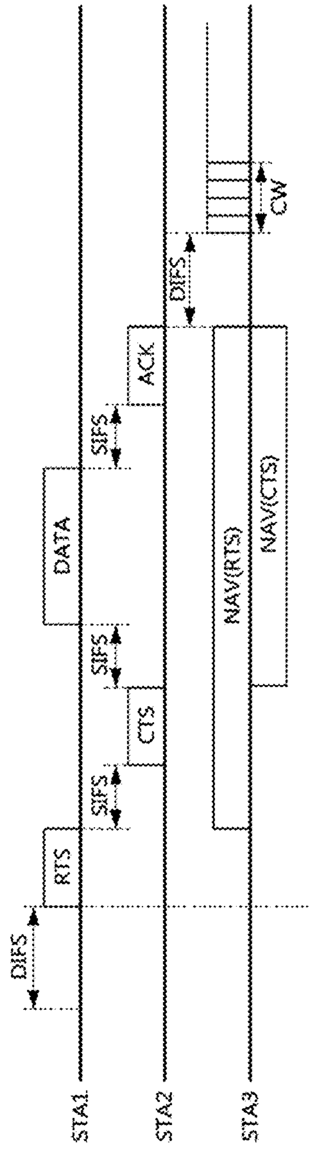
FIG. 5 illustrates a carrier sense multiple access/collision avoidance-based frame transmission procedure, in accordance with some embodiments of the present disclosure.

FIG. 5 illustrates a Carrier Sense Multiple Access with Collision Avoidance (CSMA/CA)-based frame transmission procedure designed to prevent collisions among frames on a channel, according to an embodiment. It depicts a first station (STA1) transmitting data, a second station (STA2) receiving the data, and a third station (STA3) situated in an area where it can receive a frame from either STA1, STA2, or both. Stations STA1, STA2, and STA3 may represent WLAN devices 104 as shown in FIG. 1.

The station STA1 may assess whether the channel is occupied by performing carrier sensing. It can determine the channel’s status based on the energy level present in the channel, the autocorrelation of signals within the channel, or by utilizing a Network Allocation Vector (NAV) timer to ascertain channel occupation.

After determining that the channel is not occupied by other devices (i.e., the channel is IDLE) during a DIFS (and performing backoff, if required), the station STA1 may transmit a Request-To-Send (RTS) frame to station STA2. Upon receiving the RTS frame, after a SIFS, station STA2 may transmit a Clear-To-Send (CTS) frame in response. If Dual-CTS is enabled and station STA2 is an access point, the access point may issue two CTS frames in response to the RTS frame—for example, a first CTS frame in a non-High Throughput (non-HT) format and a second CTS frame in the High Throughput (HT) format.

When station STA3 receives the RTS frame, it may set its Network Allocation Vector (NAV) timer for the transmission duration of subsequently transmitted frames (for example, a duration of SIFS+CTS frame duration+SIFS+data frame duration+SIFS+ACK frame duration) using the duration information included in the RTS frame. If station STA3 receives the CTS frame, it may set its NAV timer for the transmission duration of subsequently transmitted frames based on the duration information included in the CTS frame. Upon receiving a new frame before the NAV timer expires, station STA3 may update its NAV timer using the duration information from the new frame. Station STA3 does not attempt to access the channel until its NAV timer expires.

When station STA1 receives the CTS frame from station STA2, it may transmit a data frame to station STA2 after a SIFS period elapses from the time when the CTS frame has been completely received. Upon successfully receiving the data frame, station STA2 may transmit an ACK frame in response to the data frame after a SIFS period elapses.

When the NAV timer expires, the third station STA3 may determine whether the channel is busy using carrier sensing.

Upon determining that the channel is not occupied by other devices during a DIFS period after the NAV timer has expired, station STA3 may attempt to access the channel after a contention window elapses, according to a backoff process.

When Dual-CTS is enabled, a station that has obtained a transmission opportunity (TXOP) and that has no data to transmit may transmit a CF-End frame to cut short the TXOP. An access point receiving a CF-End frame with the Basic Service Set Identifier (BSSID) of the access point as the destination address may respond by transmitting two additional CF-End frames: the first CF-End frame using Space Time Block Coding (STBC) and the second CF-End frame using non-STBC. A station receiving a CF-End frame resets its NAV timer to 0 at the end of the PHY Protocol Data Unit (PPDU) containing the CF-End frame. FIG. 5 illustrates station STA2 transmitting an ACK frame to acknowledge the successful reception of a frame by the recipient.

With clear demand for higher peak throughput/capacity in Wi-Fi, a new working group for an amendment called 11be (Extreme High Throughput, EHT) has been created to support an increase in the peak PHY rate. Considering 802.11b to 802.11ac, the peak PHY rate has increased by a factor of 5 or 11, as shown in the table of FIG. 6. In the case of 11ax, known as Wi-Fi 6, the 11ax working group focused on improving efficiency, not peak PHY rate, in dense environments. Note that the Max PHY data rate (in gigabits per second (Gbps)) and PHY rate enhancement (factor) for 11be could rely on the highest MCS (e.g., 4,096 QAM and its code rate) to be determined.

The focus of 11be is on wireless local area network (WLAN) indoor and outdoor operation with stationary and pedestrian speeds in the 2.4, 5, and 6 gigahertz (GHz) frequency bands. In addition to the peak PHY rate, different candidate features are under discussion, include some or all of: 320 MHz bandwidth and more efficient utilization of non-contiguous spectrum; multi-band/multi-channel aggregation and operation; 16 spatial streams and multiple-input, multiple-output (MIMO) protocol enhancements; multi-access point coordination (e.g., coordinated and joint transmission); enhanced link adaptation and retransmission protocol (e.g., Hybrid Automatic Repeat Request (HARQ)); and, if needed, adaptation to regulatory rules specific to the 6 GHz spectrum.

Some features, like increasing the bandwidth and the number of spatial streams, are solutions that have been proven to be effective in previous projects focused on increasing link throughput and for which feasibility demonstration is achievable.

As for operation bands (2.4/5/6 gigahertz (GHz)) for 11be, more than 1 GHz of additional unlicensed spectrum is likely to be available around the year 2020 because the 6 GHZ band (5.925-7.125 GHZ) is being considered for unlicensed use. It would allow access points and stations to become tri-band devices. Larger than 160 MHz data transmission (e.g., 320 MHZ) could be considered to increase the max PHY rate. For example, 320 MHz or 160+160 MHz data could be transmitted in the 6 GHz band. Alternatively, 160+160 MHz data could be transmitted across the 5 and 6 GHz bands.

A transmitting station generates a PHY Protocol Data Unit (PPDU) frame and transmits it to a receiving station. The receiving station receives, detects, and processes the PPDU. If an Extremely High Throughput (EHT) PPDU frame comprises a legacy part (e.g., an L-STF field, an L-LTF field, and an L-SIG field), an EHT-SIG-A field, an EHT-SIG-B field, an EHT-HARQ field, an EHT-STF field, an EHT-LTF field, and an EHT-DATA field, then the table of FIG. 7 describes the fields of the EHT PPDU frame in more detail. However, many fields remain empty and are yet to be determined for further discussion.

The distributed nature of channel access networks, such as Institute of Electrical and Electronics Engineers (IEEE) 802.11 wireless local area networks (WLANs), makes the carrier sense mechanism important for collision-free operation. The physical carrier sense of one station is responsible for detecting the transmissions of other stations. However, it may be impossible to detect every single case in some circumstances. For example, one station, which may be a long distance away from another station, may see the medium as idle and begin transmitting frames as well. To overcome this hidden node problem, the network allocation vector (NAV) has been introduced. However, as the IEEE 802.11 standard evolves to include multiple users' simultaneous transmission/reception scheduled within a BSS, such as UL/DL MU transmission in a cascaded manner, modified or newly defined mechanisms may be needed.

In this disclosure, multi-user (MU) transmission refers to cases where multiple frames are transmitted to or from multiple stations simultaneously using different resources, wherein examples of different resources are different frequency resources in OFDMA transmission and different spatial streams in multi-user multiple-input, multiple-output (MU-MIMO) transmission. Therefore, DL-OFDMA, DL-MU-MIMO, UL-OFDMA, and UL-MU-MIMO are examples of MU transmission.

Wireless local area network (WLAN) systems rely on the retransmission of medium access control (MAC) MPDUs when the TX (transmitter) does not receive the acknowledgment from the RX (receiver) OR when MPDUs are not decoded at the RX. In this ARQ (automatic repeat request) approach, the receiver discards the last failed MPDU before receiving the newly retransmitted one. With the requirements for enhanced reliability and reduced latency, the 11be working group decided that it should evolve toward hybrid ARQ (HARQ).

There are two methods of HARQ processing. In the Type 1 HARQ scheme, also referred to as chase combining (CC), the signals to be retransmitted in this part are the same as the signals that failed before because all subpackets to be retransmitted use the same puncturing pattern. Puncturing is needed to remove some of the parity bits after encoding with an error-correction code. The reason for using the same puncturing pattern in CC-HARQ is to generate the coded data sequence with forward error correction (FEC) and make the receiver use maximum-ratio combining (MRC) to combine the received bits with the same bits from previous transmissions. In wireless local area network (WLAN) systems, four subpackets are created from one HARQ packet. For example, the information sequences are usually transmitted in packets with a fixed length. At a receiver, error correction and detection are carried out on the whole packet. If the packet is found to be in error, the conventional ARQ scheme is inefficient in the presence of burst errors. To solve this problem more efficiently, this situation can be improved if subpackets are applied. In subpacket transmissions, only those subpackets that include errors need to be retransmitted.

With subpackets, since the receiver uses both the current and the previously received subpackets to decode, the error probability in decoding decreases as the number of used subpackets increases. The decoding process passes the CRC check and ends when the packet is decoded without errors or the maximum number of subpackets is reached. Basically, because it operates in the stop-and-wait protocol, if the terminal can decode the packet, it sends an ACK to the transmitter. When the transmitter receives the ACK correctly, it terminates the HARQ transmission of the packet. If the terminal cannot decode the packet, it sends a NAK to the transmitter, and the transmitter performs the retransmission process.

In the Type 2 HARQ scheme, also referred to as Incremental Redundancy (IR), different puncturing patterns are used for each subpacket, so the signal of this portion changes for each subpacket. IR uses two puncturing patterns, alternating for odd-numbered and even-numbered transmissions, respectively, resulting in the coded data sequence with the coding rate which is used in IR HARQ. The redundancy scheme of IR improves the LLR (Log Likelihood Ratio) of the parity bits in order to combine information sent across different transmissions due to requests and lowers the code rate as additional subpackets are used, resulting in a lower error rate of the subpackets than CC. The puncturing pattern used in HARQ is indicated by the Subpacket Identity (SPID). The SPID of the first subpacket is always set to 0, and all the systematic bits and the punctured parity bits are transmitted in the first subpacket, and self-decoding is possible when the receiving SNR environment is good. Generally, subpacket SPIDs to be transmitted are in increasing order but can be exchanged except for the first SPID.

As wireless local area network (WLAN) systems have improved, access point coordination has been discussed as a possible technology to be adopted in 11be, where there is a high-level classification depending on various access point coordination schemes. For example, there are two main types of techniques: the first type, called "coordinated," where data for a user is sent from a single access point, and the second type, called "joint," where data for a user is sent from multiple access points.

As for coordinated access point tech, multiple access points are either 1) transmitting on the same frequency resource based on coordination and forming spatial nulls to allow for simultaneous transmission from multiple access points, or 2) transmitting on orthogonal frequency resources by coordinating and splitting the spectrum to use it more efficiently. As for joint access point tech, multiple access points are transmitting jointly to a given user.

The solutions provided herein have been described with reference to a wireless LAN system; however, these solutions are also applicable to other network environments, such as cellular telecommunication networks, wired networks, etc.

An embodiment of the invention may be an article of manufacture in which a non-transitory machine-readable medium (such as microelectronic memory) has stored thereon instructions which program one or more data processing components (generically referred to here as a "processor" or "processing unit") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment of the invention may be an apparatus (e.g., an access point station, a non-access point station, or another network or computing device) that includes one or more hardware and software logic structures for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

Combined Co-SR and Co-BF/Nulling Scheme to Reduce Channel Feedback Information

In this disclosure, a novel approach is disclosed that combines Coordinated Spatial Reuse (Co-SR) and Coordinated Beamforming/Nulling (Co-BF/Nulling) schemes to enhance spectral efficiency in multi-AP scenarios with highly dense networks. An objective of this approach is to optimize the utilization of the wireless medium and mitigate interference among the associated STAs, thereby improving the overall system performance.

An advantage of the proposed scheme is the reduction of Channel State Information (CSI) feedback overhead. By focusing on the overlapping STAs located in the largest coordination gain area, the scheme minimizes the number of STAs involved in the CSI feedback process. This targeted approach reduces the resource requirements for CSI feedback, allowing for more efficient utilization of frequency and time resources.

Compared to using only the Co-SR scheme, the combined Co-SR and Co-BF/Nulling scheme offers a significant benefit in terms of increased coverage in multi-AP scenarios. The Co-SR scheme enables the participating APs to adjust their transmit power levels to minimize interference and ensure adequate coverage for their associated STAs. However, in dense networks with overlapping coverage areas, the Co-SR scheme alone may not be sufficient to mitigate interference effectively.

By integrating the Co-BF/Nulling scheme with the Co-SR scheme, the proposed approach addresses this limitation. The Co-BF/Nulling scheme allows the APs to apply beamforming and nulling techniques to direct their transmissions towards the intended STAs while suppressing interference towards the non-associated STAs in the largest coordination gain area. This targeted interference mitigation enhances the overall system performance and enables better coexistence of multiple APs in dense network environments.

Multi-AP Scenario

The IEEE 802.11be standard recognizes the potential of multi-Access Point (multi-AP) coordination to enhance spectral efficiency in highly dense network scenarios. However, as mentioned above, the current IEEE 802.11 standard for Coordinated spatial reuse (Co-SR) has limitations that can lead to reduced coverage and lower overall system throughput.

Various multi-AP technologies focus on increasing spectral efficiency in high density wireless networks are available, including Coordinated Beamforming/Nulling (Co-BF/Nulling/Null), Joint Transmission (JTX), and Coordinated Spatial Reuse (Co-SR). Each of these technologies has its own advantages and disadvantages. However, when compared to Co-BF/Nulling/Null and JTX, Co-SR technology stands out as an efficient option due to its simpler coordination requirements. Co-SR does not need to consider synchronization or the collection of Channel State Information (CSI), which can be complex and resource-intensive tasks. By avoiding these challenges, Co-SR offers a more straightforward and efficient approach to improving spectral efficiency in high-density networks. Despite its advantages, the current IEEE 802.11 standard for Co-SR still faces limitations in terms of reduced coverage and lower overall system throughput when adjusting AP power levels to accommodate STAs from other APs.

While Coordinated Spatial Reuse (Co-SR) is considered an efficient and easily implementable solution for improving performance in high-density wireless networks, it faces a critical issue when adjusting the transmit power between Access Points (APs). According to the current IEEE 802.11 standard for Co-SR, each AP should cover all stations (STAs) associated with its own AP. However, when adjusting the power of one AP to accommodate the power constraints required to clearly cover the STAs from another AP, the coverage of AP1 may be compromised. This reduction in coverage can prevent an AP from covering all its associated STAs, leading to a decrease in the overall system throughput. As a result, the potential benefits of Co-SR in improving spectral efficiency are hindered by this limitation in the current standard. Addressing this issue is useful for maximizing the performance improvements offered by Co-SR in high-density wireless networks.

Disclosed herein is a new combined multi-AP transmission scheme that aims to address the limitations of the current IEEE 802.11 standard for Coordinated Spatial Reuse (Co-SR). An objective of this scheme is to ensure that each Access Point (AP) can cover all stations (STAs) associated with its own AP, even when adjusting power levels to accommodate STAs from other APs. By achieving this goal, the disclosed scheme seeks to overcome the problem of reduced coverage and lower overall system throughput that arises when implementing Co-SR in high-density wireless networks. The combined multi-AP transmission scheme disclosed herein is designed to provide a comprehensive solution that maintains the coverage of each AP while optimizing the overall system performance. By enabling APs to effectively serve their associated STAs, the techniques disclosed herein aim to increase spectral efficiency in high-density wireless networks.

Figure 8:
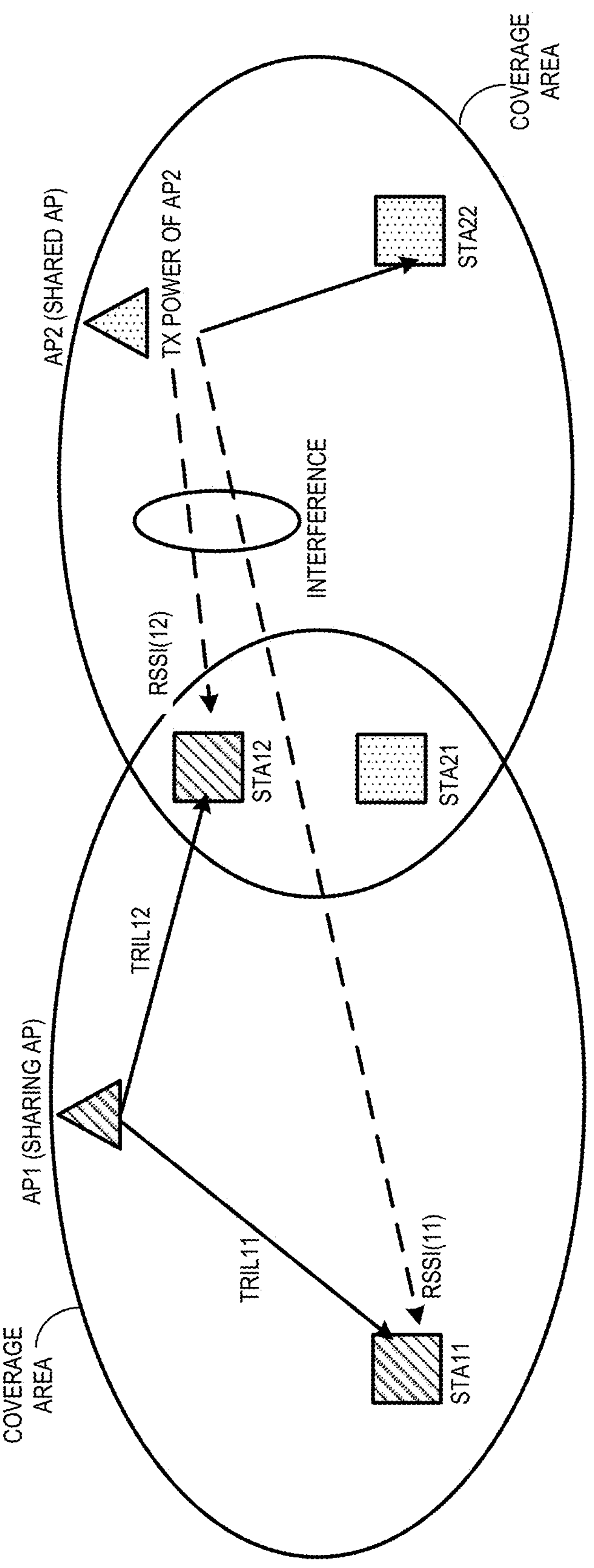
FIG. 8 illustrates an example multi-access point scenario focusing on a sharing access point, in accordance with some embodiments of the present disclosure.

In a typical scenario of an IEEE 802.11 wireless LAN, Coordinated Spatial Reuse (Co-SR) can be considered with two Access Points (APs), each having two associated stations (STAs). This scenario is illustrated in FIG. 8. In this setup, the two APs coordinate their transmissions to optimize the spatial reuse of the available spectrum. By carefully adjusting their transmit power levels and considering the interference between the APs, Co-SR aims to improve the overall system throughput and spectral efficiency. However, as discussed above, the current IEEE 802.11 standard for Co-SR may face challenges in maintaining coverage for all associated STAs when adjusting the transmit power of one AP to accommodate the STAs of the other AP. FIG. 8 provides a visual representation of this scenario, highlighting the importance of addressing the limitations of Co-SR to ensure optimal performance in high-density wireless networks.

In FIG. 8, the concept of tolerable receiver interference level (TRIL) is introduced to calculate the maximum transmit power that can be used for Coordinated Spatial Reuse (Co-SR) between two Access Points (APs), each having two associated stations (STAs) in this example. In an embodiment, TRIL is determined by subtracting the minimum Signal-to-Noise Ratio (SNR) value that yields a Packet Error Rate (PER) of less than or equal to 10% for the highest Modulation and Coding Scheme (MCS) and a safety margin value from the Received Signal Strength Indicator (RSSI) between the AP and its associated STAs. The RSSI represents the interference signal from one AP (e.g., AP2) to the associated STAs of the other AP (e.g., AP1).

Based on FIG. 8, two equations are provided to calculate the maximum transmit power for Co-SR. Equation 1 determines the Co-SR transmit power from AP2 to STA11 by subtracting the RSSI between AP2 and STA11 (RSSI(11)) from the transmit power of AP2 and adding the TRIL value for STA11 (TRIL(11)). Similarly, Equation 2 calculates the Co-SR transmit power from AP2 to STA12 by subtracting the RSSI between AP2 and STA12 (RSSI(12)) from the transmit power of AP2 and adding the TRIL value for STA12 (TRIL(12)).

$$Co\text{-}SR\ Tx \text{ power from } AP\ 2 \text{ to } STA11 <= Tx \text{ power of } AP2 - RSSI(11) + TRIL(11). \quad \text{Equation 1}$$

$$Co\text{-}SR\ Tx \text{ power from } AP\ 2 \text{ to } STA12 <= Tx \text{ power of } AP2 - RSSI(12) + TRIL(12). \quad \text{Equation 2}$$

It is important to note that the minimum SNR value and safety margin used in calculating TRIL are changeable values, allowing for flexibility in determining the appropriate transmit power for Co-SR based on the specific requirements of the wireless network.

Multi-AP Scenario after Updated TX Power

In the given scenario, AP2 adjusts its transmit power using the equations mentioned earlier (Equation 1 and Equation 2) to ensure that it can cover the STAs associated with AP1 (STA11 and STA12) while minimizing interference. However, if the calculated transmit powers from Equation 1 and Equation 2 differ, AP2 selects the smaller value to ensure that it can cover both STA11 and STA12.

For example, if the Co-SR transmit power from AP2 to STA11 is higher than the Co-SR transmit power from AP2 to STA12, AP2 will choose the transmit power determined by considering the Co-SR transmit power from AP2 to STA12. This decision ensures that AP2's transmit power is sufficient to cover both STA11 and STA12, as well as its own associated STAs, STA21 and STA22.

Figure 9:
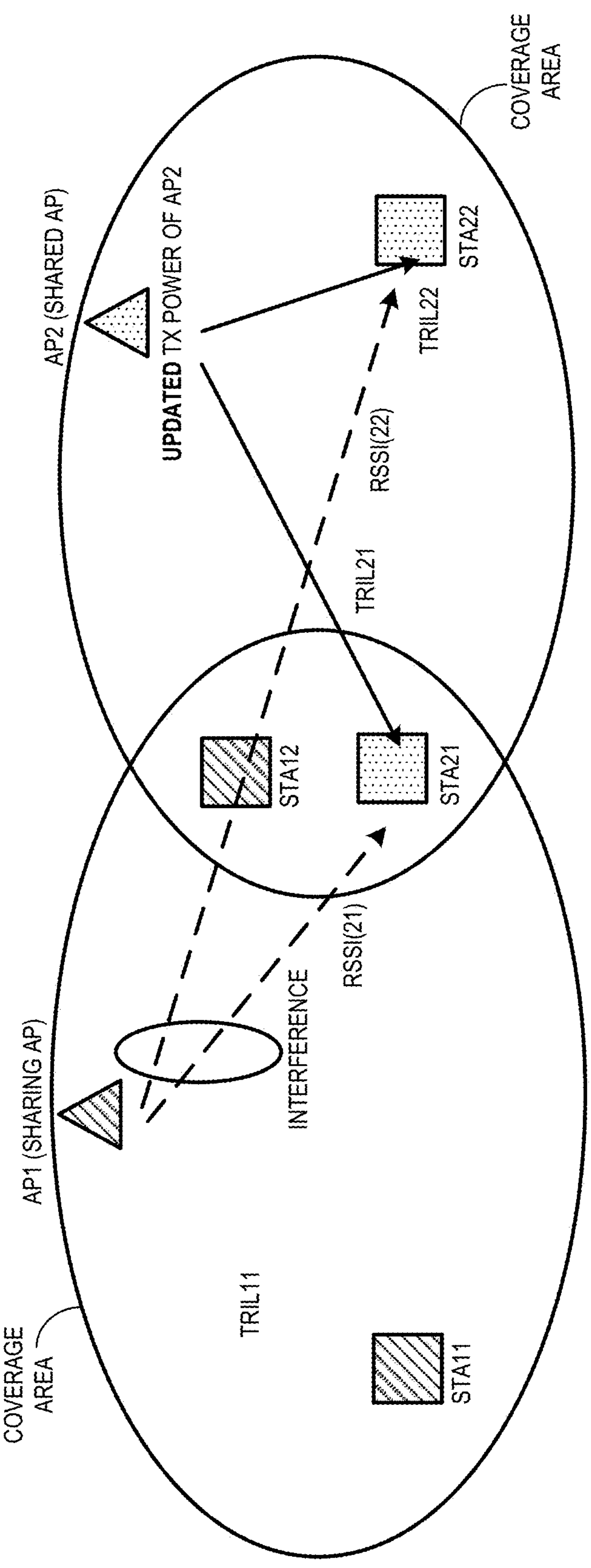
FIG. 9 illustrates an example multi-access point scenario focusing on a shared access point, in accordance with some embodiments of the present disclosure.

By adjusting AP2's transmit power based on the interference experienced by both STA11 and STA12, the scheme aims to optimize the coverage and minimize interference. However, as shown in FIG. 9, a remaining problem is to ensure that the updated transmit power of AP2 successfully covers its own associated STAs, STA21 and STA22. This is important to maintain the performance and connectivity of the STAs associated with AP2 while implementing the Co-SR scheme to manage interference and improve overall network efficiency.

In order to ensure that the updated transmit power of AP2 successfully covers its own associated STAs, STA21 and STA22, two additional equations (Equation 3 and Equation 4) are introduced. These equations verify whether the updated transmit power satisfies the necessary conditions for maintaining coverage.

$$\text{Updated } TRIL(22) >= RSSI(22). \quad \text{Equation 3}$$

$$\text{Updated } TRIL(21) >= RSSI(21). \quad \text{Equation 4}$$

Equation 3 states that the Updated TRIL(22) should be greater than or equal to RSSI(22). The Updated TRIL(22) is calculated by subtracting the minimum SNR value that yields a Packet Error Rate (PER) of less than or equal to 10% for the highest Modulation and Coding Scheme (MCS) and a safety margin value from the RSSI between AP2 and STA22 using the updated transmit power of AP2. The RSSI(22) represents the received power from AP1 to STA22, which is considered as interference at STA22.

Similarly, Equation 4 ensures that the Updated TRIL(21) is greater than or equal to RSSI(21). The Updated TRIL(21) is determined by subtracting the minimum SNR value that yields a PER of less than or equal to 10% for the highest MCS and a safety margin value from the RSSI between AP2 and STA21 using the updated transmit power of AP2. The RSSI(21) represents the received power from AP1 to STA21, which is considered as interference at STA21.

It is important to note that the minimum SNR value and safety margin used in calculating the Updated TRIL are changeable values, allowing for flexibility in determining the appropriate transmit power based on the specific requirements of the wireless network.

By verifying that the updated transmit power of AP2 satisfies Equation 3 and Equation 4, the scheme ensures that AP2 can maintain coverage for its own associated STAs, STA21 and STA22, while simultaneously managing interference and optimizing the transmit power for Co-SR with AP1.

Reduced Coverage Area

In the scenario where both Equation 3 and Equation 4 cannot be satisfied, it indicates that the updated transmit power of AP2 is insufficient to cover its own associated STAs, STA21 and STA22. This means that the adjusted transmit power, which was determined by considering the interference and coverage requirements for STA11 and STA12 associated with AP1, does not meet the necessary conditions to maintain coverage for AP2's associated STAs.

Figure 10:
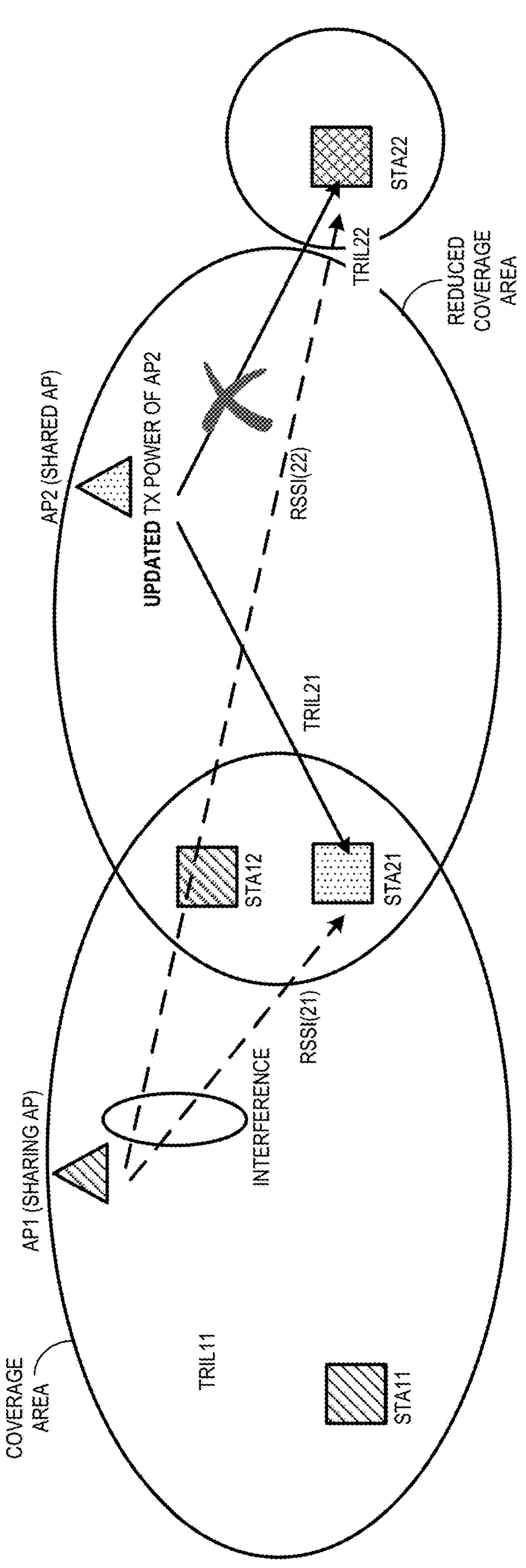
FIG. 10 illustrates an example of reduced access point coverage in coordinated spatial reuse operation, in accordance with some embodiments of the present disclosure.

For instance, if Equation 3 is not satisfied, it implies that the Updated TRIL(22) is less than RSSI(22). In other words, the updated transmit power of AP2 is not sufficient to ensure that STA22 receives the required signal strength to maintain a reliable connection. Consequently, the coverage area of AP2 may be reduced, as illustrated in FIG. 10.

This reduction in coverage can lead to performance degradation and connectivity issues for STA22, as it may not be able to communicate effectively with AP2. As a result, the overall network efficiency and user experience may be compromised.

In this disclosure, a solution is proposed to address the issue of reduced coverage for STAs associated with an AP when adjusting transmit power for Coordinated Spatial Reuse (Co-SR). The proposed approach combines Co-SR with Coordinated Beamforming (Co-BF) and Coordinated Nulling (Co-Nulling) to support the STAs that are adversely affected by the transmit power adjustments, such as STA22 in FIG. 10.

Smallest and Largest Coordination Areas

To mitigate this problem, the first step is to categorize the STAs based on their location into two areas: the largest coordination gain area and the smallest coordination gain area. The largest coordination gain area refers to the region where STAs from different APs overlap, and these STAs need to tolerate higher levels of interference from the non-associated APs. On the other hand, the smallest coordination gain area represents the region where STAs do not overlap with those of other APs, and they experience lower levels of interference from non-associated APs, resulting in smaller coordination gains.

Figure 11:
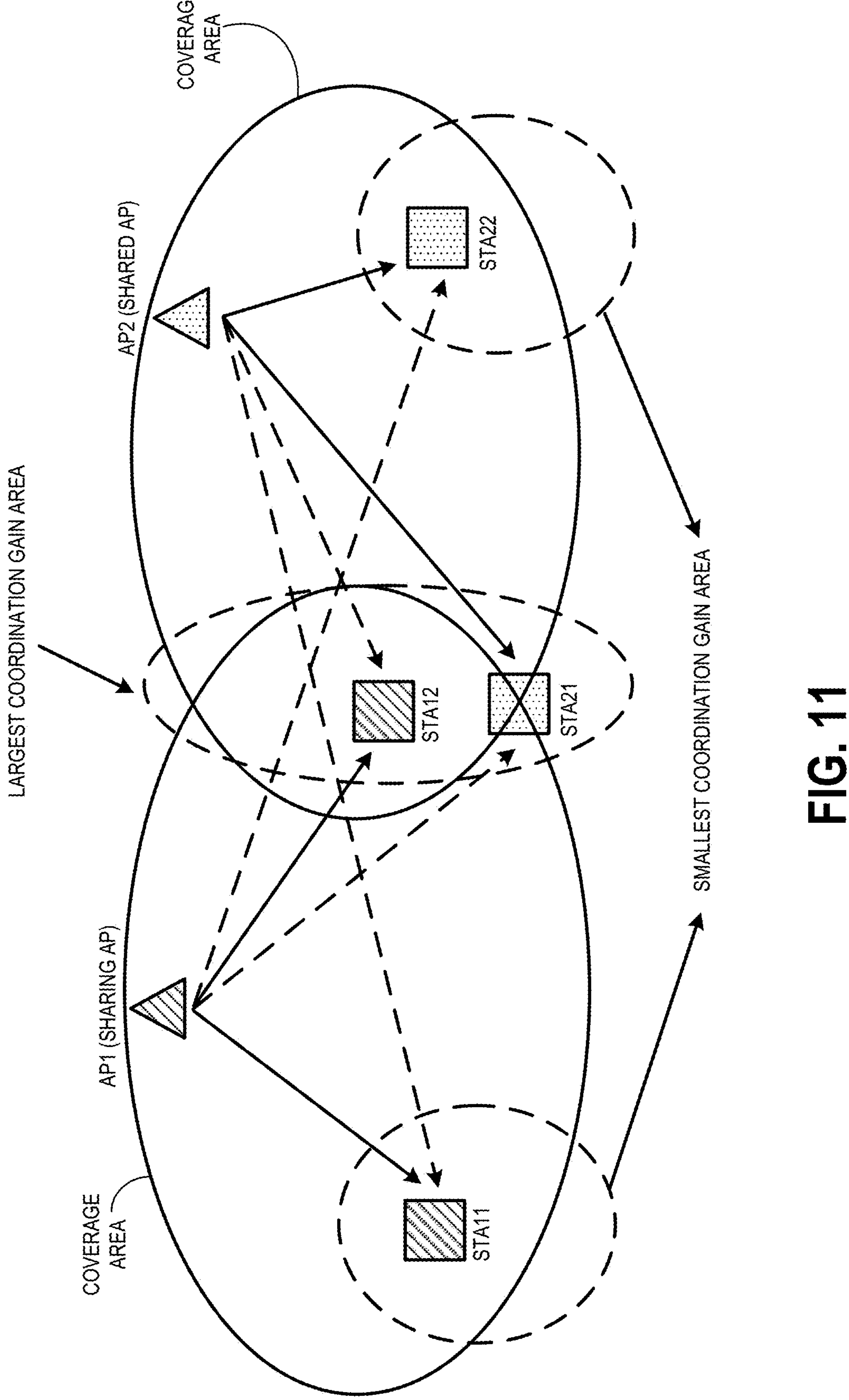
FIG. 11 illustrates an example of a smallest coordination gain area and a largest coordination area, in accordance with some embodiments of the present disclosure.

FIG. 11 illustrates these two areas and provides a clear explanation of their definitions. By distinguishing between the largest and smallest coordination gain areas, the proposed solution can effectively target the STAs that require additional support to maintain coverage and performance.

In the scenario depicted in FIG. 11, a two-step approach is proposed to address the coverage and interference issues in the wireless network. The first step involves applying the Coordinated Spatial Reuse (Co-SR) scheme only to the STAs located in the smallest coordination gain area. By focusing on these STAs, which experience low interference from non-associated APs, the transmit power of AP2 can be determined using Equation 1.

After adjusting AP2's transmit power according to Equation 1, the remaining challenge is to ensure that AP2 can cover STA21 according to Equation 3. However, due to the low interference level from non-associated APs to STAs in the smallest coordination gain area, AP2's transmit power is likely to be sufficient to cover STA22 as well.

The second step involves applying the Coordinated Beamforming (Co-BF), Coordinated Nulling (Co-Nulling), or Coordinated Nulling (Nulling) scheme only to the STAs located in the largest coordination gain area. When the Co-SR scheme is applied only to the STAs in the smallest coordination gain area, AP2's transmit power may raise significant interference to STA12, which is associated with AP1. Similarly, AP1's transmit power may cause substantial interference to STA21, which is associated with AP2.

To mitigate this interference and improve system throughput, the Co-BF, Co-Nulling, or Nulling scheme is employed. These techniques aim to eliminate or minimize the interference between non-associated APs and STAs in the largest coordination gain area. By applying beamforming or nulling techniques, the APs can direct their transmit power towards their associated STAs while minimizing the interference towards non-associated STAs.

In this disclosure, a new approach is proposed for the Coordinated Beamforming (Co-BF) and Coordinated Nulling (Co-Nulling) scheme, which focuses on the STAs located in the largest coordination gain area. This approach differs from the previous Co-BF/Nulling scheme, which required the APs to collect Channel State Information (CSI) feedback from all links, including both associated and non-associated STAs.

To illustrate the difference, consider the network topology shown in FIG. 11. In the previous Co-BF/Nulling scheme, AP1 would collect CSI feedback from its associated STAs (STA11 and STA12) as well as non-associated STAs (STA21 and STA22). Similarly, AP2 would collect CSI feedback from its associated STAs (STA21 and STA22) and non-associated STAs (STA11 and STA12).

However, in the proposed scheme, the CSI feedback is reduced to include only the links related to the largest coordination gain area. In the example, the relevant links are (AP1↔STA12, STA21) and (AP2↔STA12, STA21). By focusing on these specific links, the amount of CSI feedback required is significantly reduced compared to the previous scheme.

The advantage of this approach is that it optimizes the use of limited time and frequency resources by minimizing the CSI feedback overhead. By combining the Coordinated Spatial Reuse (Co-SR) scheme and the modified Co-BF/Nulling scheme, the proposed approach efficiently manages interference and ensures adequate coverage for STAs in the largest coordination gain area while reducing the CSI feedback burden.

In this disclosure, a combined Coordinated Spatial Reuse (Co-SR) and Coordinated Beamforming/Nulling (Co-BF/Nulling) sounding procedure is proposed.

In the context of wireless communications, a sounding procedure refers to the process of measuring and exchanging channel information between wireless devices, such as access points (APs) and stations (STAs), to facilitate various tasks like channel estimation, interference management, and resource allocation.

A purpose of a sounding procedure is to obtain channel state information (CSI) or other relevant metrics that describe the characteristics of the wireless channel between the transmitter and receiver. This information is useful for optimizing the performance of wireless communication systems, particularly in scenarios involving multiple APs and STAs.

In the combined Coordinated Spatial Reuse (Co-SR) and Coordinated Beamforming/Nulling (Co-BF/Nulling) sounding procedure disclosed herein, the sounding process involves the several aspects:

Channel Measurement: The APs and STAs participate in measuring various channel metrics, such as the Received Signal Strength Indicator (RSSI) and Tolerable Receiver Interference Level (TRIL). These measurements help in assessing the signal strength and interference levels between the devices.

Information Exchange: The measured channel information is exchanged between the Sharing AP and the Shared APs. The Sharing AP collects the measurement results from the Shared APs and disseminates the consolidated information back to them. This exchange ensures that all the participating devices have a common understanding of the channel conditions.

Transmit Power Adjustment: Based on the exchanged channel information, the Shared APs adjust their transmit power levels according to predefined equations (e.g., Equations 1 and 2 above). This adjustment aims to optimize the spatial reuse and mitigate interference among the APs and STAs.

Beamforming and Nulling: The sounding procedure may also involve the application of beamforming and nulling techniques. Beamforming focuses the transmitted signal towards the intended receiver, while nulling suppresses the signal in the direction of unintended receivers or interferers. The CSI obtained through sounding is utilized to calculate the appropriate beamforming and nulling weights.

The sounding procedure may be performed periodically or triggered by specific events, such as changes in the network topology or interference levels. It allows the wireless devices to adapt to the dynamic nature of the wireless channel and optimize their transmission strategies accordingly.

By conducting a sounding procedure, the combined Co-SR and Co-BF/Nulling scheme enables the APs and STAs to collaboratively manage the wireless resources, mitigate interference, and enhance the overall network performance in dense wireless environments.

To support the Co-SR scheme between the Sharing AP and the Shared AP, the following five steps may be performed:

Step 1—Set Sharing AP: The AP that wins the medium access through the Enhanced Distributed Channel Access (EDCA) comparison is designated as the Sharing AP, also known as the TXOP (Transmit Opportunity) owner.

In Step 1 of the combined Coordinated Spatial Reuse (Co-SR) and Coordinated Beamforming/Nulling (Co-BF/Nulling) sounding procedure, the Access Point (AP) that successfully gains access to the wireless medium is determined. This is achieved through the Enhanced Distributed Channel Access (EDCA) mechanism, which is a contention-based channel access method used in IEEE 802.11 wireless networks.

The EDCA mechanism allows multiple APs to compete for the wireless medium based on predefined access categories and their associated parameters, such as the contention window size and inter-frame spacing. Each AP competes for the medium by generating a random backoff timer and waiting for its expiration before attempting to transmit.

The AP that wins the medium access through the EDCA comparison, i.e., the AP whose backoff timer expires first and successfully transmits its frame, is designated as the Sharing AP. The Sharing AP is also referred to as the TXOP (Transmit Opportunity) owner, as it has gained the right to initiate a transmission sequence on the wireless medium.

By designating the AP that wins the medium access as the Sharing AP, the combined Co-SR and Co-BF/Nulling sounding procedure establishes a clear hierarchy among the participating APs. The Sharing AP takes the lead in coordinating the spatial reuse and interference mitigation efforts, while the other APs, referred to as the Shared APs, follow the instructions and cooperate with the Sharing AP to optimize the overall system performance.

Step 2—Set shared AP: The Sharing AP sends a Beacon or management frame to find the shared AP. The candidate AP that informs about its capability to support Co-SR operation is designated as the Shared AP.

In Step 2 of the combined Coordinated Spatial Reuse (Co-SR) and Coordinated Beamforming/Nulling (Co-BF/Nulling) sounding procedure, the Sharing AP, which has won the medium access through the EDCA comparison, initiates the process of identifying the Shared APs. To achieve this, the Sharing AP sends out a Beacon or management frame to discover the neighboring APs that are capable of participating in the Co-SR operation.

The Beacon or management frame sent by the Sharing AP serves as an invitation for other APs to join the coordinated effort. This frame includes information about the Sharing AP's capabilities and its intention to establish a Co-SR operation. The neighboring APs that receive this frame and are willing to participate in the coordinated operation respond to the Sharing AP, indicating their support for the Co-SR scheme.

The candidate APs that respond to the Sharing AP's Beacon or management frame and inform about their capability to support the Co-SR operation are then designated as the Shared APs. These Shared APs express their readiness to collaborate with the Sharing AP in optimizing the spatial reuse of the wireless medium and mitigating interference among the associated STAs.

By sending the Beacon or management frame and designating the responsive APs as Shared APs, the Sharing AP establishes a group of collaborating APs that will work together to enhance the overall system performance. The Shared APs agree to follow the instructions and cooperate with the Sharing AP in the subsequent steps of the combined Co-SR and Co-BF/Nulling sounding procedure.

Step 3—Measurement calculation: Beacon measurement type or ongoing packet/NDP (Null Data Packet) frame is used to measure the Received Signal Strength Indicator (RSSI) and Tolerable Receiver Interference Level (TRIL).

In Step 3 of the combined Coordinated Spatial Reuse (Co-SR) and Coordinated Beamforming/Nulling (Co-BF/Nulling) sounding procedure, the participating APs, including the Sharing AP and the Shared APs, perform measurements to gather essential information for effective coordination. Two key metrics are measured in this step: the Received Signal Strength Indicator (RSSI) and the Tolerable Receiver Interference Level (TRIL).

To measure these metrics, the APs employ either the Beacon measurement type or utilize ongoing packet transmissions, such as Null Data Packet (NDP) frames. The Beacon measurement type involves the APs actively scanning and measuring the signal strength of the Beacon frames transmitted by neighboring APs. By analyzing the received Beacon frames, the APs can determine the RSSI, which represents the strength of the received signal from other APs.

Alternatively, the APs can leverage ongoing packet transmissions or NDP frames to measure the RSSI and TRIL. NDP frames are special frames that contain no data payload and are used for various purposes, including channel sounding and measurement. By examining the received NDP frames or ongoing packet transmissions from neighboring APs, the participating APs can assess the signal strength and interference levels.

The RSSI measurement provides information about the signal strength of the neighboring APs, allowing the Sharing AP and the Shared APs to assess the potential interference and plan their transmission strategies accordingly. On the other hand, the TRIL represents the maximum interference level that a receiver can tolerate while still maintaining acceptable performance. By measuring the TRIL, the APs can determine the interference threshold beyond which the performance of the associated STAs may be compromised.

The measurement of RSSI and TRIL is useful for the effective implementation of the Co-SR and Co-BF/Nulling schemes. These metrics enable the APs to gain an understanding of the signal strengths and interference levels in the network, facilitating informed decisions regarding transmit power control, spatial reuse optimization, and interference mitigation techniques.

Step 4—Co-SR setup: The Sharing AP informs the Shared AP about the measurement results, including RSSI and TRIL.

In Step 4 of the combined Coordinated Spatial Reuse (Co-SR) and Coordinated Beamforming/Nulling (Co-BF/Nulling) sounding procedure, the Sharing AP takes the lead in communicating the measurement results obtained in the previous step to the Shared APs. This step involves the Sharing AP conveying the Received Signal Strength Indicator (RSSI) and Tolerable Receiver Interference Level (TRIL) values to the Shared APs.

After the Sharing AP and the Shared APs have completed the measurements using either the Beacon measurement type or ongoing packet/NDP frames, the Sharing AP collects and consolidates the measurement results. The Sharing AP, being the coordinator of the multi-AP coordination group, takes the responsibility of disseminating this information to the Shared APs.

The Sharing AP sends a message or a series of messages to each Shared AP, informing them about the RSSI and TRIL values obtained from the measurements. The RSSI values indicate the signal strength of the neighboring APs, while the TRIL values represent the maximum interference level that each AP can tolerate without compromising the performance of its associated STAs.

By sharing the measurement results, the Sharing AP ensures that all the participating APs have a common understanding of the signal strengths and interference levels in the network. The Shared APs, upon receiving the measurement results from the Sharing AP, can analyze the RSSI and TRIL values to assess the potential impact of interference on their associated STAs. They can use this information to adjust their transmit power levels, optimize their spatial reuse strategies, and apply appropriate interference mitigation techniques, such as beamforming or nulling, to minimize the interference and enhance the overall network performance.

Step 5—Update Co-SR transmit power of Shared AP: The transmit power of the Shared AP (e.g., AP2) is updated using Equations 1 and 2 above. For example, if the maximum Co-SR transmit power from AP2 to STA11 (calculated using Equation 1) is larger than the maximum Co-SR transmit power from AP2 to STA12 (calculated using Equation 2), the updated transmit power of the AP2 is determined by the maximum Co-SR transmit power from AP2 to STA11 (Equation 1). Conversely, if the maximum Co-SR transmit power from AP2 to STA21 (Equation 2) is larger than the maximum Co-SR transmit power from AP2 to STA11 (Equation 1), the updated transmit power of the Shared AP is determined by the maximum Co-SR transmit power from AP2 to STA21 (Equation 2).

In Step 5 of the combined Coordinated Spatial Reuse (Co-SR) and Coordinated Beamforming/Nulling (Co-BF/Nulling) sounding procedure, the transmit power of the Shared AP is adjusted based on the measurement results obtained in the previous steps. This adjustment is performed using two equations: Equation 1 and Equation 2.

Equation 1 calculates the maximum Co-SR transmit power from AP2 (Shared AP) to STA11, which is associated with AP1 (Sharing AP). This equation takes into account the transmit power of AP2, the received signal strength indicator (RSSI) between AP2 and STA11, and the tolerable receiver interference level (TRIL) of STA11.

Equation 2, on the other hand, calculates the maximum Co-SR transmit power from AP2 to STA12, which is also associated with AP1. Similar to Equation 1, this equation considers the transmit power of AP2, the RSSI between AP2 and STA12, and the TRIL of STA12.

The updated transmit power of the Shared AP (AP2) is determined by comparing the results of Equation 1 and Equation 2. If the maximum Co-SR transmit power from AP2 to STA11 (calculated using Equation 1) is larger than the maximum Co-SR transmit power from AP2 to STA12 (calculated using Equation 2), then the updated transmit power of AP2 is set to the value obtained from Equation 1. This ensures that AP2 uses the appropriate transmit power to cover STA11 while minimizing interference to STA12.

Conversely, if the maximum Co-SR transmit power from AP2 to STA21 (calculated using Equation 2) is larger than the maximum Co-SR transmit power from AP2 to STA11 (calculated using Equation 1), then the updated transmit power of AP2 is set to the value obtained from Equation 2. In this case, AP2 adjusts its transmit power to cover STA21 while minimizing interference to STA11.

This procedure establishes the necessary communication and coordination between the Sharing AP and the Shared AP to enable the Co-SR scheme. By exchanging measurement results and updating the transmit power of the Shared AP based on the calculated values from Equations 1 and 2 above, the system can effectively manage interference and optimize the spatial reuse of the wireless medium.

Reduce CSI Feedback

After the Co-SR setup and transmit power update procedure, the Channel State Information (CSI) acquisition procedure is performed, as illustrated in FIG. 12. This procedure differs from previous multi-AP schemes, such as Coordinated Beamforming/Nulling (Co-BF/Nulling), Joint Transmission (JTX), etc., which typically require CSI feedback from all STAs associated with the participating APs.

In the proposed scheme, CSI feedback is only considered from the STAs located in the largest coordination gain area, as shown in FIG. 11. By focusing on these STAs, which experience significant interference from non-associated APs, the scheme optimizes the allocation of frequency and time resources for CSI feedback.

By limiting the CSI feedback to the STAs in the largest coordination gain area, the proposed scheme reduces the overall CSI feedback resource requirements. Instead of allocating resources for CSI feedback from all STAs, the scheme allocates wideband resources specifically for the overlapping STAs, i.e., those in the largest coordination gain area.

This targeted approach to CSI feedback acquisition has several benefits. First, it minimizes the overhead associated with CSI feedback by reducing the number of STAs involved in the process. Second, it allows for more efficient utilization of frequency and time resources by concentrating the allocated resources on the STAs that are most affected by interference from non-associated APs.

Co-SR Plus Co-BF/Nulling Transmit Data

Figure 13:
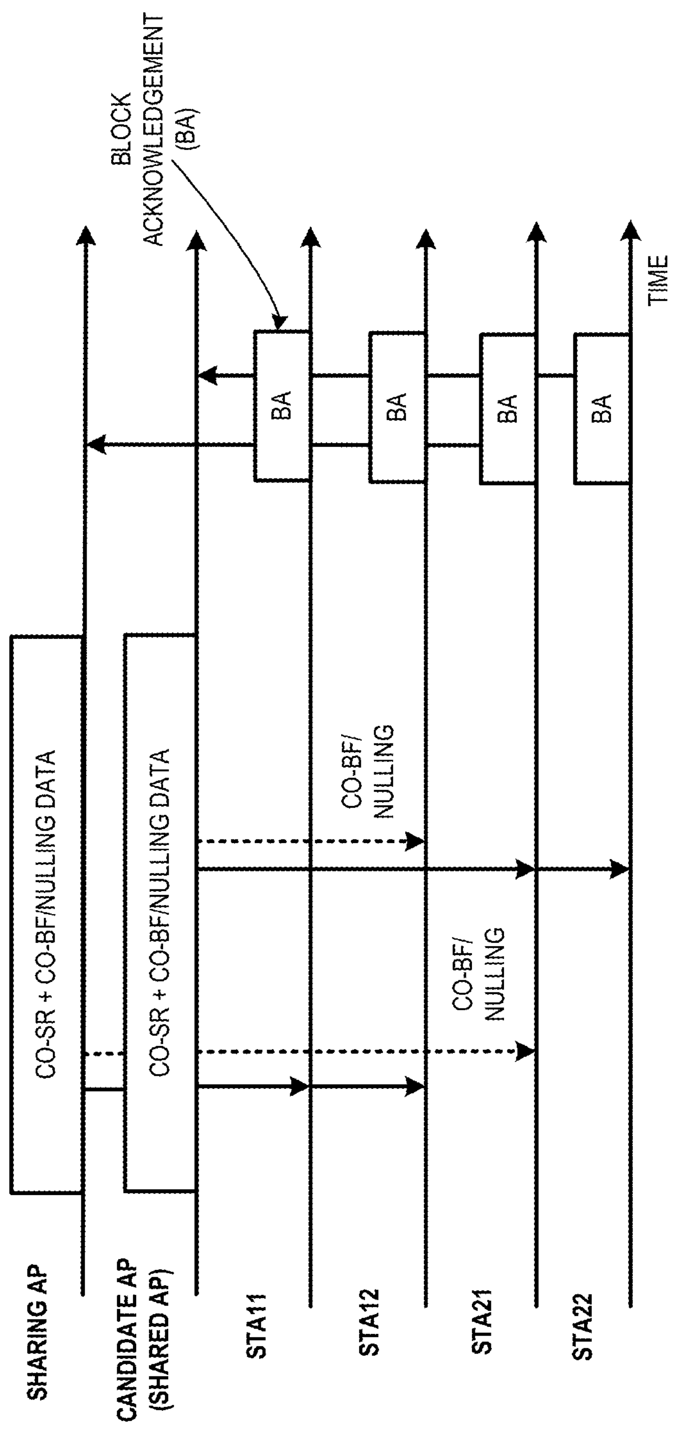
FIG. 13 illustrates an example of using a combination of coordinated spatial reuse and coordinated beamforming/nulling to transmit data, in accordance with some embodiments of the present disclosure.

In the final stage, the proposed scheme presents an opportunity to apply the combined Coordinated Spatial Reuse (Co-SR) and Coordinated Beamforming/Nulling (Co-BF/Nulling) scheme in a multi-AP scenario, as depicted in FIG. 13. This scenario involves multiple APs collaborating to optimize the spatial reuse of the wireless medium and mitigate interference among the associated STAs.

By leveraging the Co-SR scheme, the participating APs can adjust their transmit power levels to minimize interference and maximize the overall system throughput. The Co-SR scheme allows the APs to coordinate their transmissions and ensure that each AP can adequately cover its associated STAs while reducing the impact of interference on neighboring APs and their associated STAs.

In addition to the Co-SR scheme, the Co-BF/Nulling scheme is applied to further enhance the system performance. The Co-BF/Nulling scheme focuses on the STAs located in the largest coordination gain area, as identified in the previous steps. By applying beamforming and nulling techniques, the APs can direct their transmissions towards the intended STAs while minimizing interference towards the non-associated STAs in the largest coordination gain area.

The combination of Co-SR and Co-BF/Nulling schemes in the multi-AP scenario offers several advantages. First, it allows for efficient spatial reuse of the wireless medium by enabling multiple APs to operate concurrently while minimizing interference. Second, it improves the overall system throughput by optimizing the transmit power levels and reducing the impact of interference on the associated STAs.

Furthermore, the selective application of the Co-BF/Nulling scheme to the STAs in the largest coordination gain area helps to reduce the complexity and overhead associated with the coordination process. By focusing on the STAs that experience the most significant interference, the scheme can effectively mitigate interference while minimizing the resource requirements for coordination.

In this disclosure, a novel approach has been disclosed that combines Coordinated Spatial Reuse (Co-SR) and Coordinated Beamforming/Nulling (Co-BF/Nulling) schemes to enhance spectral efficiency in multi-AP scenarios with highly dense networks. An objective of this approach is to optimize the utilization of the wireless medium and mitigate interference among the associated STAs, thereby improving the overall system performance.

An advantage of the proposed scheme is the reduction of Channel State Information (CSI) feedback overhead. By focusing on the overlapping STAs located in the largest coordination gain area, the scheme minimizes the number of STAs involved in the CSI feedback process. This targeted approach reduces the resource requirements for CSI feedback, allowing for more efficient utilization of frequency and time resources.

Compared to using only the Co-SR scheme, the combined Co-SR and Co-BF/Nulling scheme offers a significant benefit in terms of increased coverage in multi-AP scenarios. The Co-SR scheme enables the participating APs to adjust their transmit power levels to minimize interference and ensure adequate coverage for their associated STAs. However, in dense networks with overlapping coverage areas, the Co-SR scheme alone may not be sufficient to mitigate interference effectively.

By integrating the Co-BF/Nulling scheme with the Co-SR scheme, the proposed approach addresses this limitation. The Co-BF/Nulling scheme allows the APs to apply beamforming and nulling techniques to direct their transmissions towards the intended STAs while suppressing interference towards the non-associated STAs in the largest coordination gain area. This targeted interference mitigation enhances the overall system performance and enables better coexistence of multiple APs in dense network environments.

Sharing Access Point Method

Figure 14:
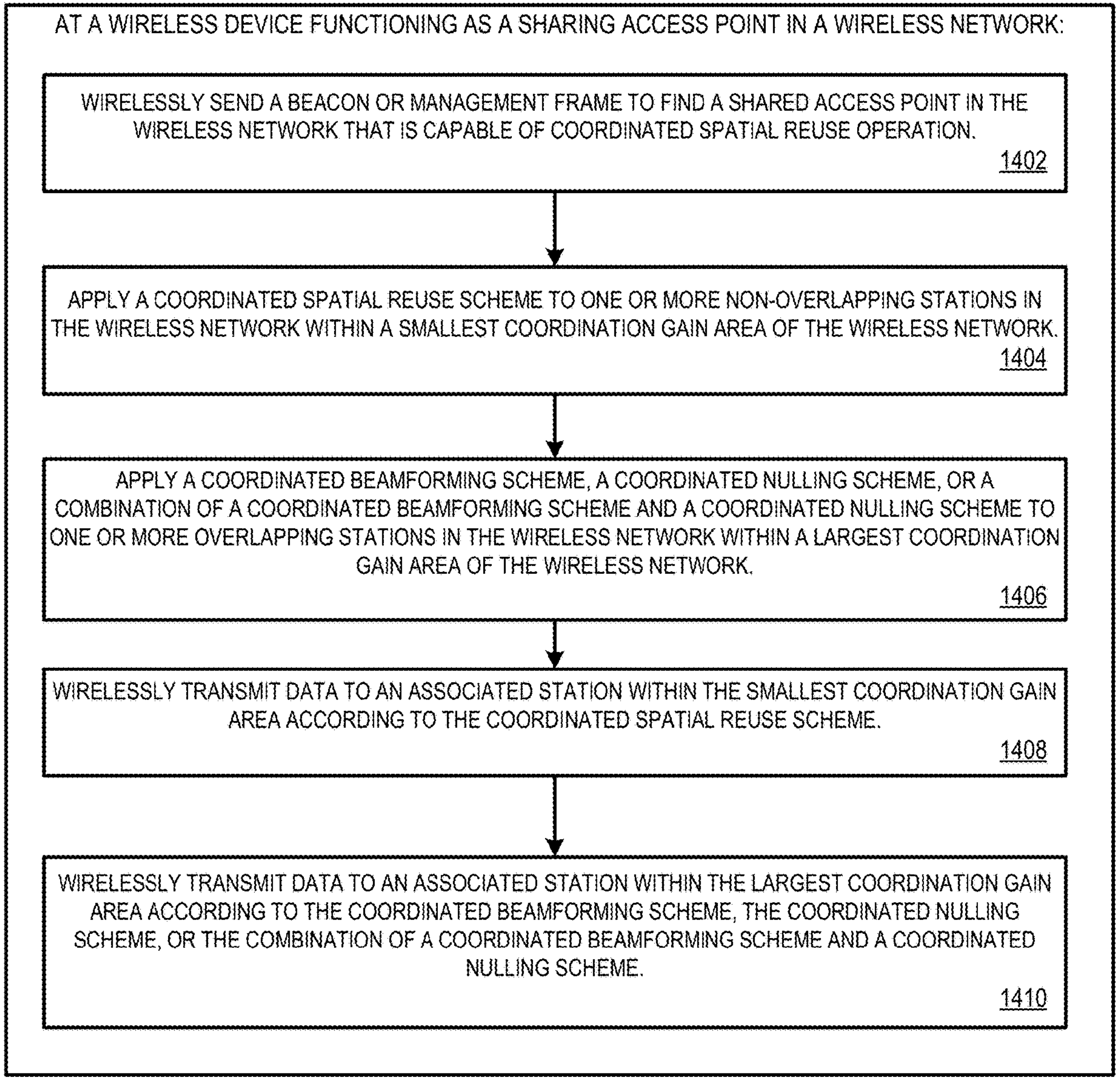
FIG. 14 illustrates a method performed by a wireless device functioning as a sharing access point in a wireless network, in accordance with some embodiments of the present disclosure.

FIG. 14 illustrates a method 1400 performed by a wireless device functioning as a sharing access point in a wireless network. The method 1400 involves several steps to improve spectral efficiency and coverage in dense multi-access point wireless networks.

At step 1402, the sharing access point wirelessly sends a beacon or management frame to find a shared access point in the wireless network that is capable of coordinated spatial reuse operation. This step 1402 initiates the process of identifying and collaborating with another access point to implement the combined coordinated spatial reuse (Co-SR) and coordinated beamforming/nulling (Co-BF/Nulling) schemes.

To implement step 1402 to find a shared access point in the wireless network that is capable of coordinated spatial reuse operation, the sharing access point can follow specific process. First, the sharing access point prepares a beacon or management frame that includes information indicating its desire to find a shared access point for coordinated spatial reuse operation. This information can be included in a specific field or Information Element (IE) within the beacon or management frame, depending on the wireless network standard being used (e.g., IEEE 802.11).

Next, the sharing access point wirelessly transmits the prepared beacon or management frame using its radio interface. The frame is broadcasted over the wireless medium, allowing other access points in the vicinity to receive and process the information. The beacon or management frame may be transmitted periodically or triggered by specific events, depending on the implementation and network requirements.

Upon receiving the beacon or management frame, potential shared access points in the network examine the included information to determine if they are capable of supporting coordinated spatial reuse operation. This examination may involve checking their own capabilities, configurations, and available resources to ensure compatibility with the sharing access point's requirements.

If a potential shared access point determines that it is capable of coordinated spatial reuse operation and willing to collaborate with the sharing access point, it responds by sending a frame (e.g., a probe response or an association response) indicating its readiness to participate. This response frame may include additional information about the shared access point's capabilities, such as supported features, available channels, or other relevant parameters.

Upon receiving responses from potential shared access points, the sharing access point evaluates the received information to select the most suitable shared access point for coordinated spatial reuse operation. The selection process may consider factors such as signal strength, channel conditions, supported features, and available resources to ensure optimal performance and compatibility.

Once the sharing access point has selected a shared access point, it may initiate further communication and coordination procedures to establish the necessary parameters and settings for the coordinated spatial reuse operation. This may involve exchanging additional frames or messages to synchronize their operations, agree on specific transmission parameters, and coordinate their activities to minimize interference and optimize network performance.

At step 1404, the sharing access point applies a coordinated spatial reuse scheme to one or more non-overlapping stations within the smallest coordination gain area of the wireless network. The smallest coordination gain area represents the region where stations experience minimal interference from neighboring access points. By applying Co-SR to these stations, the sharing access point can efficiently manage resources and improve overall network performance.

The identification of non-overlapping stations can be based on various factors, such as the stations' physical locations, signal strength measurements, or interference levels. The sharing access point may use techniques like radio resource measurements, channel sounding, or feedback from the stations themselves to determine which stations fall within the smallest coordination gain area.

Once the non-overlapping stations are identified, the sharing access point applies a coordinated spatial reuse scheme to optimize their communication. The coordinated spatial reuse scheme aims to maximize the utilization of the available spectrum while minimizing interference among the stations and access points.

The specific implementation of the coordinated spatial reuse scheme may vary depending on the wireless network standard and the capabilities of the involved devices.

For example, the sharing access point may assign different frequency channels or subcarriers to the non-overlapping stations to minimize interference and maximize spatial reuse. By carefully allocating frequency resources, the sharing access point ensures that nearby stations can communicate simultaneously without causing significant interference to each other.

As another example, the sharing access point may adjust the transmission power levels of the non-overlapping stations to optimize their coverage and minimize interference. By dynamically adapting the power levels based on the stations' locations and channel conditions, the sharing access point can ensure that each station receives a strong signal while limiting its impact on neighboring stations.

As yet another example, if the sharing access point and the non-overlapping stations support directional antennas or beamforming capabilities, the coordinated spatial reuse scheme may involve steering the transmission beams towards the intended receivers. By focusing the signal energy in specific directions, the sharing access point can enhance the signal quality for the desired stations while reducing interference to other stations.

As still yet another example, the sharing access point may coordinate its spatial reuse decisions with the shared access point to ensure optimal performance across the entire network. This coordination may involve exchanging information about the stations' locations, interference levels, and transmission parameters to make informed decisions and avoid conflicts.

The sharing access point may continuously monitor the network conditions and adapt the coordinated spatial reuse scheme as needed. It may periodically reassess the stations' locations, measure interference levels, and adjust the spatial reuse parameters to maintain optimal performance.

At step 1406, the sharing access point applies a coordinated beamforming scheme, a coordinated nulling scheme, or a combination of both to one or more overlapping stations within the largest coordination gain area of the wireless network. The largest coordination gain area represents the region where stations experience significant interference from neighboring access points. By using Co-BF/Nulling techniques, the sharing access point can mitigate interference and enhance signal quality for these overlapping stations.

Here, the sharing access point identifies the overlapping stations within the largest coordination gain area of the wireless network. These stations are characterized by their significant interference from neighboring access points.

The identification of overlapping stations can be based on factors such as the stations' physical locations, signal strength measurements, or interference levels. The sharing access point may use techniques like radio resource measurements, channel sounding, or feedback from the stations to determine which stations fall within the largest coordination gain area.

Once the overlapping stations are identified, the sharing access point applies either a coordinated beamforming scheme, a coordinated nulling scheme, or a combination of both, depending on the capabilities of the involved devices and the network requirements.

In a coordinated beamforming scheme, the sharing access point and the overlapping stations employ beamforming techniques to focus the signal energy towards the desired receivers while minimizing interference to other stations. The sharing access point coordinates with the shared access point to jointly optimize their beamforming patterns. They exchange information about the channels, user locations, and interference conditions to calculate the optimal beamforming weights. By steering the transmission beams towards the intended receivers, the coordinated beamforming scheme enhances the signal strength and quality for the overlapping stations.

In a coordinated nulling scheme, the sharing access point and the overlapping stations use nulling techniques to suppress interference from neighboring access points and stations. The sharing access point coordinates with the shared access point to jointly determine the nulling patterns. They exchange information about the interference sources, channel conditions, and user locations to calculate the optimal nulling weights. By placing nulls in the direction of interfering stations, the coordinated nulling scheme minimizes the impact of interference on the overlapping stations.

In a combination of coordinated beamforming and nulling schemes, the sharing access point may also employ a combination of both coordinated beamforming and nulling schemes to achieve optimal performance for the overlapping stations. In this approach, the sharing access point and the shared access point jointly optimize their transmission and reception patterns by applying beamforming to enhance the desired signals and nulling to suppress interference. They exchange necessary information and collaborate to calculate the optimal combination of beamforming and nulling weights.

The specific implementation details of the coordinated beamforming and nulling schemes may vary depending on the wireless network standard and the capabilities of the involved devices. The sharing access point and the shared access point may use techniques like channel state information (CSI) feedback, sounding packets, or predefined codebooks to estimate the channel conditions and calculate the appropriate beamforming and nulling weights.

The sharing access point may continuously monitor the network conditions and adapt the coordinated beamforming and nulling schemes as needed. It may periodically reassess the overlapping stations' locations, measure interference levels, and adjust the beamforming and nulling parameters to maintain optimal performance.

At step 1408, the sharing access point wirelessly transmits data to an associated station within the smallest coordination gain area according to the coordinated spatial reuse scheme. This step involves the actual data transmission to stations in the smallest coordination gain area, leveraging the benefits of the Co-SR scheme to improve spectral efficiency and reduce interference.

The sharing access point may identify the associated station within the smallest coordination gain area that requires data transmission. This station is among the non-overlapping stations that have been previously identified and subjected to the coordinated spatial reuse scheme.

Once the associated station is identified, the sharing access point prepares the data packets to be transmitted. The data packets are encapsulated according to the wireless network standard and may include headers, payloads, and error correction codes. The sharing access point may also apply any necessary security measures, such as encryption or authentication, to protect the data during transmission.

Next, the sharing access point determines the transmission parameters for the data packets based on the coordinated spatial reuse scheme. This involves selecting the appropriate frequency channel, transmission power level, and other relevant settings that have been optimized for the smallest coordination gain area. The sharing access point may refer to the previously determined spatial reuse parameters, such as frequency reuse patterns or power control settings, to ensure optimal transmission.

If the coordinated spatial reuse scheme involves directional transmission or beamforming, the sharing access point may also adjust its antenna patterns or apply beamforming weights to focus the signal energy towards the intended associated station. This helps to enhance the signal strength and quality at the receiver while minimizing interference to other stations.

Once the transmission parameters are set, the sharing access point wirelessly transmits the data packets to the associated station using its radio interface. The transmission is performed over the selected frequency channel and with the determined power level. The sharing access point may also employ techniques like link adaptation or modulation and coding scheme (MCS) selection to adapt to the channel conditions and optimize the data rate.

After transmitting the data packets, the sharing access point awaits an acknowledgment (ACK) from the associated station to confirm successful reception. If an ACK is received, the sharing access point considers the transmission complete and proceeds with the next data packets or stations. If an ACK is not received within a specified time frame, the sharing access point may retransmit the data packets or initiate error recovery mechanisms according to the wireless network standard.

The sharing access point may continuously monitor the transmission process and the network conditions. It may adjust the transmission parameters or adapt the coordinated spatial reuse scheme based on feedback from the associated station or changes in the network environment. This ensures that the data transmission remains optimized and efficient within the smallest coordination gain area.

At step 1410, the sharing access point wirelessly transmits data to an associated station within the largest coordination gain area according to the coordinated beamforming scheme, the coordinated nulling scheme, or a combination of both. This step involves the actual data transmission to stations in the largest coordination gain area, utilizing the Co-BF/Nulling techniques to enhance signal quality and mitigate interference.

The sharing access point may identify the associated station within the largest coordination gain area that requires data transmission. This station is among the overlapping stations that have been previously identified and subjected to the coordinated beamforming, nulling, or combined schemes.

Once the associated station is identified, the sharing access point prepares the data packets to be transmitted. The data packets are encapsulated according to the wireless network standard and may include headers, payloads, and error correction codes. The sharing access point may also apply any necessary security measures, such as encryption or authentication, to protect the data during transmission.

Next, the sharing access point determines the transmission parameters for the data packets based on the selected coordinated scheme (beamforming, nulling, or a combination of both). This involves selecting the appropriate frequency channel, transmission power level, and other relevant settings that have been optimized for the largest coordination gain area. The sharing access point may refer to the previously determined beamforming and nulling parameters, such as beamforming weights or nulling patterns, to ensure optimal transmission.

If the coordinated beamforming scheme is employed, the sharing access point adjusts its antenna patterns or applies the calculated beamforming weights to focus the signal energy towards the intended associated station. This helps to enhance the signal strength and quality at the receiver while minimizing interference to other stations.

If the coordinated nulling scheme is used, the sharing access point applies the calculated nulling weights to suppress interference from neighboring access points and stations. By placing nulls in the direction of interfering stations, the sharing access point minimizes the impact of interference on the associated station.

If a combination of coordinated beamforming and nulling schemes is employed, the sharing access point applies both the beamforming weights to enhance the desired signal and the nulling weights to suppress interference simultaneously.

Once the transmission parameters are set, the sharing access point wirelessly transmits the data packets to the associated station using its radio interface. The transmission is performed over the selected frequency channel and with the determined power level. The sharing access point may also employ techniques like link adaptation or modulation and coding scheme (MCS) selection to adapt to the channel conditions and optimize the data rate.

After transmitting the data packets, the sharing access point awaits an acknowledgment (ACK) from the associated station to confirm successful reception. If an ACK is received, the sharing access point considers the transmission complete and proceeds with the next data packets or stations. If an ACK is not received within a specified time frame, the sharing access point may retransmit the data packets or initiate error recovery mechanisms according to the wireless network standard.

The sharing access point may continuously monitor the transmission process and the network conditions. It may adjust the transmission parameters or adapt the coordinated beamforming, nulling, or combined schemes based on feedback from the associated station or changes in the network environment. This ensures that the data transmission remains optimized and efficient within the largest coordination gain area.

Shared Access Point Method

Figure 15:
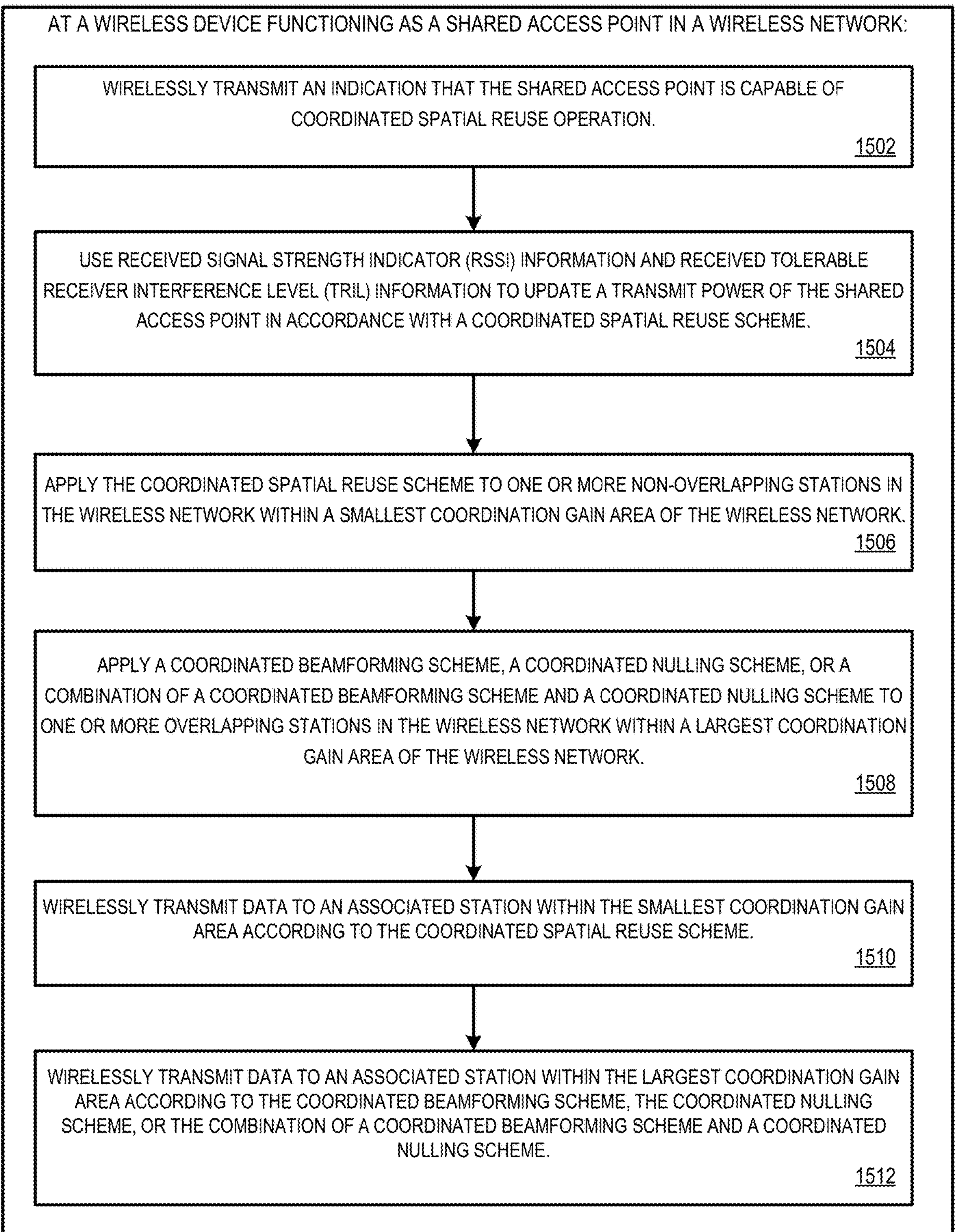
FIG. 15 illustrates a method performed by a wireless device functioning as a shared access point in a wireless network, in accordance with some embodiments of the present invention.

FIG. 15 illustrates a method 1500 performed by a wireless device functioning as a shared access point in a wireless network. The method 1500 involves several steps to improve spectral efficiency and coverage in dense multi-access point wireless networks.

At step 1502, the shared access point wirelessly transmits an indication that it is capable of coordinated spatial reuse operation. This step 1502 involves sending a signal or message to inform other access points in the network about its ability to participate in coordinated spatial reuse. The indication can be transmitted through various means, such as beacon frames, management frames, or dedicated signaling messages, depending on the wireless network standard and protocols being used.

At step 1504, the shared access point uses received signal strength indicator (RSSI) information and received tolerable receiver interference level (TRIL) information to update its transmit power in accordance with a coordinated spatial reuse scheme. RSSI and TRIL are measurements that provide insights into the signal strength and interference levels experienced by the shared access point and its associated stations. By analyzing this information, the shared access point can adjust its transmit power to optimize performance and minimize interference. The coordinated spatial reuse scheme guides the transmit power adjustment based on predefined rules or algorithms that take into account the network topology, user distribution, and interference conditions.

The shared access point can follow a specific process that uses Equations 1, 2, 3, and 4 or the like described above. First, the shared access point collects RSSI and TRIL information from its associated stations and neighboring access points. RSSI indicates the strength of the received signal, while TRIL represents the maximum interference level that a receiver can tolerate while still maintaining acceptable performance.

The shared access point then uses Equations 1 and 2 or the like to calculate the maximum transmit power it can use for coordinated spatial reuse (Co-SR) with respect to each associated station of the sharing access point. For example, Equation 1 states that the Co-SR transmit power from the shared access point (AP2) to the sharing access point's associated station (STA11) should be less than or equal to the shared access point's transmit power minus the RSSI from the shared access point to the sharing access point's associated station (STA11) plus the TRIL of the sharing access point's associated station (STA11.) Similarly, Equation 2 applies the same calculation for the other of the sharing access point's associated station STA12. These equations ensure that the shared access point's transmit power does not cause excessive interference to the sharing access point's associated stations.

Continuing the example, after calculating the maximum Co-SR transmit power values using Equations 1 and 2, the shared access point selects the smaller value to ensure that it can cover all the sharing access point's associated stations while minimizing interference while also covering its own associated stations. The shared access point then verifies if this updated transmit power is sufficient to cover its own associated stations (STA21 and STA22) using Equations 3 and 4. Equation 3 checks if the updated TRIL of STA22, which is the RSSI from the shared access point to STA22 using the updated transmit power minus the minimum SNR required for acceptable performance, is greater than or equal to the RSSI from the sharing access point to STA22. Similarly, Equation 4 applies the same check for STA21.

In an embodiment, the shared access point (AP2) determines its transmit power for coordinated spatial reuse (Co-SR) based on Equations 1 and 2, which take into account the stations (STAs) associated with the sharing AP. The shared AP calculates the Co-SR power for each of the sharing AP1's associated STAs and creates a list of these calculated values. Since the distance between the shared AP and each of the sharing AP's associated STAs can vary, the calculated Co-SR power values will be different for each STA.

When the shared AP2 selects the highest power from the list of calculated Co-SR powers, it is likely that this power value corresponds to the furthest STA associated with the sharing AP. The reason behind this is that the furthest STA typically requires a higher transmit power to maintain a satisfactory connection quality and overcome path loss and other factors affecting signal propagation over longer distances.

However, if the shared AP2 uses this highest Co-SR power, which is optimized for the furthest STA, it may lead to increased interference for the shortest STA associated with the sharing AP1. This is because the shortest STA is closer to the shared AP2 and may be more sensitive to higher transmit powers from nearby devices. The excessive transmit power used by the shared AP2, while necessary for the furthest STA, can introduce more interference than required for the shortest STA, potentially degrading its performance and connection quality.

To mitigate this issue, the shared AP2 may need to consider additional strategies or modifications to the Co-SR power selection process. One approach could be to use a lower Co-SR power that strikes a balance between the requirements of the furthest and shortest STAs, even if it means sacrificing some performance for the furthest STA. Another option could be to employ more advanced techniques, such as coordinated beamforming or nulling, to focus the signal towards the intended STAs while minimizing interference to others.

The shared AP2 must carefully consider the trade-offs between maximizing coverage for the furthest STA and minimizing interference for the shortest STA when deciding on the appropriate Co-SR power. The specific approach taken may depend on various factors, such as the network topology, performance requirements, and capabilities of the involved devices.

If both equations 3 and 4 are satisfied, the shared access point can use the updated transmit power for coordinated spatial reuse while ensuring coverage for its own associated stations. However, if either Equation 3 or 4 is not satisfied, the shared access point (AP2) can use the larger value of Equations 1 and 2 for the updated transmit power to ensure coverage combined with applying coordinated beamforming, coordinated nulling, or a combination of coordinated beamforming and coordinated nulling to stations within the largest coordination gain area.

In an embodiment, when the shared access point (AP2) chooses the smaller Co-SR power from the list of calculated values, it aims to minimize interference to the sharing AP1's associated stations (STAs). However, this smaller Co-SR power may not be sufficient to maintain adequate coverage for the shared AP2's own associated STAs. To determine whether the shared AP2's basic service set (BSS) STAs can still be within the service area using the smaller Co-SR power, the shared AP2 utilizes Equations 3 and 4.

Equations 3 and 4 help the shared AP2 assess whether the chosen smaller Co-SR power will lead to potential problems for its own associated STAs. If the smaller Co-SR power is not sufficient to provide the required coverage and signal strength for the shared AP2's STAs, those STAs may experience increased interference from the sharing AP. This is because the sharing AP1's transmissions, although optimized for its own associated STAs, can still cause interference to the shared AP2's STAs, especially if they are located closer to the sharing AP1.

In such a scenario, where the smaller Co-SR power leads to increased interference for the shared AP2's STAs, it may be more efficient for the shared AP2 to cancel or refrain from using the smaller Co-SR power altogether. By doing so, the shared AP2 prioritizes the performance and connection quality of its own associated STAs, even if it means sacrificing some of the potential benefits of coordinated spatial reuse with the sharing AP1.

The decision to cancel the smaller Co-SR power depends on the specific network conditions, performance requirements, and the trade-offs between the benefits of coordinated spatial reuse and the potential interference caused to the shared AP2's STAs. The shared AP2 can carefully evaluate the impact of the smaller Co-SR power on its own STAs and determine whether it is more advantageous to proceed with the coordinated spatial reuse or prioritize the performance of its own STAs by canceling the smaller Co-SR power.

If the shared AP2 decides to cancel the smaller Co-SR power, it may need to explore alternative strategies to optimize its transmissions and mitigate interference. This could involve techniques such as adjusting its own transmit power, employing coordinated beamforming or nulling, or engaging in further coordination with the sharing AP1 to find a more suitable balance between spatial reuse and interference management.

The shared AP2's decision to cancel the smaller Co-SR power depends on its assessment of the interference situation and its priority to ensure the best possible performance for its own associated STAs.

At step 1506, the shared access point applies the coordinated spatial reuse scheme to one or more non-overlapping stations within the smallest coordination gain area of the wireless network. Similar to the method 1400, this step involves identifying the non-overlapping stations in the area with minimal interference and applying techniques such as frequency reuse, power control, and directional transmission to optimize their communication. The shared access point coordinates with other access points to ensure efficient utilization of spectrum resources and minimize interference among the non-overlapping stations.

At step 1508, the shared access point applies a coordinated beamforming scheme, a coordinated nulling scheme, or a combination of both to one or more overlapping stations within the largest coordination gain area of the wireless network. This step is similar to the corresponding step in method 140, where the shared access point employs advanced signal processing techniques to enhance signal quality and mitigate interference for the overlapping stations. The choice of scheme depends on the capabilities of the involved devices and the network requirements. Coordinated beamforming focuses the signal energy towards the intended receivers, while coordinated nulling suppresses interference from neighboring access points and stations.

At step 1510, the shared access point wirelessly transmits data to an associated station within the smallest coordination gain area according to the coordinated spatial reuse scheme. This step involves the actual data transmission to the non-overlapping stations, leveraging the optimized transmission parameters and spatial reuse techniques determined in the previous steps. The shared access point ensures efficient utilization of spectrum resources and minimizes interference during the data transmission process.

At step 1512, the shared access point wirelessly transmits data to an associated station within the largest coordination gain area according to the coordinated beamforming scheme, the coordinated nulling scheme, or a combination of both. This step involves the actual data transmission to the overlapping stations, utilizing the advanced signal processing techniques and interference mitigation strategies determined in the previous steps. The shared access point optimizes the transmission parameters and adapts to the channel conditions to enhance signal quality and minimize interference during the data transmission process.

In methods 1400 and 1500, coordinated spatial reuse refers generally to a technique employed in wireless networks to optimize the utilization of available spectrum resources and improve overall network efficiency. It involves the coordination and collaboration among multiple access points (APs) to enable simultaneous transmissions on the same frequency channel while minimizing interference. In coordinated spatial reuse, APs intelligently manage their transmission parameters, such as power levels and directional antennas, to maximize spatial reuse and reduce interference to neighboring APs and stations. By carefully controlling the transmission power and directing the signal energy towards the intended receivers, APs can transmit concurrently without causing significant interference to each other. This allows for more efficient use of the available spectrum, increased network capacity, and improved overall performance, particularly in dense network environments where multiple APs and stations coexist in close proximity.

In methods 1400 and 1500, coordinated beamforming refers generally to a technique used in wireless networks to enhance signal quality and mitigate interference by coordinating the transmission beams of multiple access points (APs) or stations. In coordinated beamforming, APs collaborate and exchange information about the channel conditions, user locations, and interference scenarios to jointly optimize their beamforming patterns. By adjusting the amplitude and phase of the transmitted signals, APs can focus the signal energy towards the intended receivers while minimizing interference to other users. This is achieved through the use of multiple antennas and advanced signal processing algorithms that allow APs to shape and steer the transmission beams in specific directions. Coordinated beamforming enables APs to concentrate the signal power towards the desired users, improving signal strength, data rates, and overall network performance. It is particularly beneficial in scenarios with high user density and interference, where coordinated beamforming helps to mitigate the impact of interference and enhance the quality of service for individual users.

In methods 1400 and 1500, coordinated nulling refers to a technique employed in wireless networks to mitigate interference and improve signal quality by coordinating the placement of nulls in the transmission patterns of multiple access points (APs) or stations. In coordinated nulling, APs collaborate and exchange information about the interference sources, channel conditions, and user locations to jointly optimize their nulling strategies. By adjusting the amplitude and phase of the transmitted signals, APs can create nulls or regions of low signal strength in the direction of interfering users or APs. This effectively suppresses the interference caused by neighboring transmissions, allowing the desired signals to be received with higher quality and reduced interference. Coordinated nulling involves advanced signal processing techniques and the use of multiple antennas to precisely control the shape and direction of the nulls. It is particularly useful in dense network environments where interference from multiple sources can significantly degrade performance. By coordinating the placement of nulls, APs can minimize the impact of interference on the desired users, leading to improved signal-to-interference ratio, increased data rates, and better overall network performance.

While coordinated spatial reuse, coordinated beamforming, and coordinated nulling are all techniques used in wireless networks to optimize performance and mitigate interference, they differ in their approach and focus. Coordinated spatial reuse aims to maximize the utilization of available spectrum by enabling simultaneous transmissions on the same frequency channel while minimizing interference through careful power control and directional transmissions. Coordinated beamforming, on the other hand, focuses on enhancing signal quality and mitigating interference by coordinating the transmission beams of multiple APs or stations to concentrate signal energy towards the intended receivers. Coordinated nulling, in contrast, emphasizes the suppression of interference by coordinating the placement of nulls in the transmission patterns of APs or stations to minimize the impact of interfering signals on the desired users. While all three techniques involve coordination and collaboration among APs or stations, they target different aspects of interference management and network optimization, with coordinated spatial reuse focusing on efficient spectrum utilization, coordinated beamforming on signal enhancement, and coordinated nulling on interference suppression.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

at a wireless device functioning as a sharing access point in a wireless network:

wirelessly sending a beacon or management frame to find a shared access point in the wireless network that is capable of coordinated spatial reuse operation;

applying a coordinated spatial reuse scheme to one or more non-overlapping stations in the wireless network within a smallest coordination gain area of the wireless network;

applying a coordinated beamforming scheme, a coordinated nulling scheme, or a combination of a coordinated beamforming scheme and a coordinated nulling scheme to one or more overlapping stations in the wireless network within a largest coordination gain area of the wireless network;

wirelessly transmitting data to an associated station within the smallest coordination gain area according to the coordinated spatial reuse scheme; and wirelessly transmitting data to an associated station within the largest coordination gain area according to the coordinated beamforming scheme, the coordinated nulling scheme, or a combination of a coordinated beamforming scheme and a coordinated nulling scheme, wherein the applying to the one or more overlapping stations comprises:

allocating resources for channel state information (CSI) feedback only to the one or more overlapping stations; and applying, based on CSI feedback received via the resource from the one or more overlapping stations, the coordinated beamforming scheme, the coordinated nulling scheme, or the combination of the coordinated beamforming scheme and the coordinated nulling scheme to the one or more overlapping stations.

2. The method of claim 1, further comprising:

at the wireless device functioning as the sharing access point:

after wirelessly sending the beacon or management frame to find a shared access point in the wireless network that is capable of coordinated spatial reuse operation, wirelessly receiving an indication sent by a candidate shared access point in the wireless network that the candidate shared access point supports coordinated spatial reuse operation; and selecting the candidate shared access point as the shared access point.

3. The method of claim 1, further comprising:

at the wireless device functioning as the sharing access point:

participating in an enhanced distributed channel access (EDCA) comparison; and selecting itself as the sharing access point based on a result of the EDCA comparison.

4. The method of claim 1, further comprising:

at the wireless device functioning as the sharing access point:

using beacon measurement type, ongoing packets, or Null Data Packet (NDP) frames to measure a received signal strength indicator (RSSI) and a tolerable receiver interference level (TRIL) for an associated station.

5. The method of claim 4, further comprising:

at the wireless device functioning as the sharing access point:

wirelessly transmitting the received signal strength indicator (RSSI) and the tolerable receiver interference level (TRIL) for the associated station to the shared access point for use by the shared access point to update a transmit power of the shared access point according to the coordinated spatial reuse scheme.

6. The method of claim 1, wherein the allocating resources for CSI feedback comprises:

allocating wide band resources only to the one or more overlapping stations, excluding the one or more non-overlapping stations, to reduce CSI feedback overhead.

7. A method comprising:

at a wireless device functioning as a shared access point in a wireless network:

wirelessly transmitting an indication that the shared access point is capable of coordinated spatial reuse operation;

using received signal strength indicator (RSSI) information and received tolerable receiver interference level (TRIL) information to update a transmit power of the shared access point in accordance with a coordinated spatial reuse scheme;

applying the coordinated spatial reuse scheme to one or more non-overlapping stations in the wireless network within a smallest coordination gain area of the wireless network;

applying a coordinated beamforming scheme, a coordinated nulling scheme, or a combination of a coordinated beamforming scheme and a coordinated nulling scheme to one or more overlapping stations in the wireless network within a largest coordination gain area of the wireless network;

wirelessly transmitting data to an associated station within the smallest coordination gain area according to the coordinated spatial reuse scheme; and wirelessly transmitting data to an associated station within the largest coordination gain area according to the coordinated beamforming scheme, the coordinated nulling scheme, or a combination of a coordinated beamforming scheme and a coordinated nulling scheme, wherein the applying to the one or more overlapping stations comprises:

allocating resources for channel state information (CSI) feedback only to the one or more overlapping stations; and applying, based on CSI feedback received via the resource from the one or more overlapping stations, the coordinated beamforming scheme, the coordinated nulling scheme, or the combination of a coordinated beamforming scheme and a coordinated nulling scheme to the one or more overlapping stations.

8. The method of claim 7, further comprising:

at the wireless device functioning as the shared access point:

applying the coordinated beamforming scheme, the coordinated nulling scheme, or the combination of a coordinated beamforming scheme and a coordinated nulling scheme to one or more overlapping stations in the wireless network within the largest coordination gain area of the wireless network based on determining that an updated transmit power for the shared access point is not sufficient to cover all stations associated with the shared access point.

9. The method of claim 7, wherein the allocating resources for CSI feedback comprises:

allocating wide band resources only to the one or more overlapping stations, excluding the one or more non-overlapping stations, to reduce CSI feedback overhead.

10. The method of claim 7, further comprising:

at the wireless device functioning as the shared access point:

wirelessly transmitting the indication that the shared access point is capable of coordinated spatial reuse operation in response to receiving a beacon or management frame from a sharing access point the wireless network, the beacon or management frame sent by the sharing access point to find a candidate access point in the wireless network that is capable of coordinate spatial reuse operation.

11. A wireless device to function as a sharing access point in a wireless network, the wireless device comprising:

a radio frequency transceiver;

a memory device storing a set of instructions; and a set of one or more processors coupled to the memory device, wherein the set of instructions, when executed by one or more processors of the set of one or more processors, causes the sharing access point to perform:

wirelessly sending a beacon or management frame to find a shared access point in the wireless network that is capable of coordinated spatial reuse operation;

applying a coordinated spatial reuse scheme to one or more non-overlapping stations in the wireless network within a smallest coordination gain area of the wireless network;

applying a coordinated beamforming scheme, a coordinated nulling scheme, or a combination of a coordinated beamforming scheme and a coordinated nulling scheme to one or more overlapping stations in the wireless network within a largest coordination gain area of the wireless network;

wirelessly transmitting data to an associated station within the smallest coordination gain area according to the coordinated spatial reuse scheme; and wirelessly transmitting data to an associated station within the largest coordination gain area according to the coordinated beamforming scheme, the coordinated nulling scheme, or a combination of a coordinated beamforming scheme and a coordinated nulling scheme, wherein the applying to the one or more overlapping stations comprises:

allocating resources for channel state information (CSI) feedback only to the one or more overlapping stations; and applying, based on CSI feedback received via the resource from the one or more overlapping stations, the coordinated beamforming scheme, the coordinated nulling scheme, or the combination of a coordinated beamforming scheme and a coordinated nulling scheme to the one or more overlapping stations.

12. The wireless device of claim 11, the memory device storing an additional set of instructions which, when executed by one or more processors of the set of one or more processors, causes the sharing access point to perform:

after wirelessly sending the beacon or management frame to find a shared access point in the wireless network that is capable of coordinated spatial reuse operation, wirelessly receiving an indication sent by a candidate shared access point in the wireless network that the candidate shared access point supports coordinated spatial reuse operation; and selecting the candidate shared access point as the shared access point.

13. The wireless device of claim 11, the memory device storing an additional set of instructions which, when executed by one or more processors of the set of one or more processors, causes the sharing access point to perform:

participating in an enhanced distributed channel access (EDCA) comparison; and selecting itself as the sharing access point based on a result of the EDCA comparison.

14. The wireless device of claim 11, the memory device storing an additional set of instructions which, when executed by one or more processors of the set of one or more processors, causes the sharing access point to perform:

using beacon measurement type, ongoing packets, or Null Data Packet (NDP) frames to measure a received signal strength indicator (RSSI) and a tolerable receiver interference level (TRIL) for an associated station.

15. The wireless device of claim 14, the memory device storing an additional set of instructions which, when executed by one or more processors of the set of one or more processors, causes the sharing access point to perform:

wirelessly transmitting the received signal strength indicator (RSSI) and the tolerable receiver interference level (TRIL) for the associated station to the shared access point for use by the shared access point to update a transmit power of the shared access point according to the coordinated spatial reuse scheme.

16. The wireless device of claim 11, wherein the allocating resources for CSI feedback comprises:

allocating wide band resources only to the one or more overlapping stations, excluding the one or more non-overlapping stations, to reduce CSI feedback overhead.

17. A wireless device to function as a shared access point in a wireless network, the wireless device comprising:

a radio frequency transceiver;

a memory device storing a set of instructions; and a set of one or more processors coupled to the memory device, wherein the set of instructions, when executed by one or more processors of the set of one or more processors, causes the shared access point to perform:

wirelessly transmitting an indication that the shared access point is capable of coordinated spatial reuse operation;

using received signal strength indicator (RSSI) information and received tolerable receiver interference level (TRIL) information to update a transmit power of the shared access point in accordance with a coordinated spatial reuse scheme;

applying the coordinated spatial reuse scheme to one or more non-overlapping stations in the wireless network within a smallest coordination gain area of the wireless network;

applying a coordinated beamforming scheme, a coordinated nulling scheme, or a combination of a coordinated beamforming scheme and a coordinated nulling scheme to one or more overlapping stations in the wireless network within a largest coordination gain area of the wireless network;

wirelessly transmitting data to an associated station within the smallest coordination gain area according to the coordinated spatial reuse scheme; and wirelessly transmitting data to an associated station within the largest coordination gain area according to the coordinated beamforming scheme, the coordinated nulling scheme, or the combination of a coordinated beamforming scheme and a coordinated nulling scheme, wherein the applying to the one or more overlapping stations comprises:

allocating resources for channel state information (CSI) feedback only to the one or more overlapping stations; and applying, based on CSI feedback received via the resource from the one or more overlapping stations, the coordinated beamforming scheme, the coordinated nulling scheme, or the combination of a coordinated beamforming scheme and a coordinated nulling scheme to the one or more overlapping stations.

18. The wireless device of claim 17, the memory device storing an additional set of instructions which, when executed by one or more processors of the set of one or more processors, causes the shared access point to perform:

applying the coordinated beamforming scheme, the coordinated nulling scheme, or the combination of a coordinated beamforming scheme and a coordinated nulling scheme to one or more overlapping stations in the wireless network within the largest coordination gain area of the wireless network based on determining that an updated transmit power for the shared access point is not sufficient to cover all stations associated with the shared access point.

19. The wireless device of claim 17, wherein the allocating resources for CSI feedback comprises:

allocating wide band resources only to the one or more overlapping stations, excluding the one or more non-overlapping stations, to reduce CSI feedback overhead.

20. The wireless device of claim 17, the memory device storing an additional set of instructions which, when executed by one or more processors of the set of one or more processors, causes the shared access point to perform:

wirelessly transmitting the indication that the shared access point is capable of coordinated spatial reuse operation in response to receiving a beacon or management frame from a sharing access point the wireless network, the beacon or management frame sent by the sharing access point to find a candidate access point in the wireless network that is capable of coordinate spatial reuse operation.

* * * * *